United States Patent
Yanai

(10) Patent No.: US 9,377,674 B2
(45) Date of Patent: Jun. 28, 2016

(54) IMAGE DISPLAY DEVICE

(71) Applicant: SEIKO EPSON CORPORATION, Tokyo (JP)

(72) Inventor: Hiroaki Yanai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 385 days.

(21) Appl. No.: 13/944,384

(22) Filed: Jul. 17, 2013

(65) Prior Publication Data
US 2014/0043374 A1 Feb. 13, 2014

(30) Foreign Application Priority Data
Aug. 7, 2012 (JP) ................................. 2012-175361

(51) Int. Cl.
| G03B 21/16 | (2006.01) |
| G03B 21/20 | (2006.01) |
| H04N 13/04 | (2006.01) |
| H04N 9/31 | (2006.01) |

(52) U.S. Cl.
CPC ............ G03B 21/16 (2013.01); G03B 21/2013 (2013.01); G03B 21/2033 (2013.01); H04N 9/3144 (2013.01); H04N 13/0429 (2013.01); H04N 13/0431 (2013.01); H04N 13/0459 (2013.01)

(58) Field of Classification Search
CPC ............... G03B 21/16; G03B 21/2013; G03B 21/2033; H04N 9/3164; H04N 9/3144; H04N 13/0452; H04N 13/0454
USPC ...................... 353/7, 10, 52, 57, 85
See application file for complete search history.

(56) References Cited

U.S. PATENT DOCUMENTS

| 7,029,129 | B2* | 4/2006 | Shimada | .............. H04N 9/3105 348/E9.027 |
| 8,226,244 | B2* | 7/2012 | Yamagishi | ............. G03B 21/16 353/119 |
| 2005/0024600 | A1* | 2/2005 | Cole | ...................... G03B 21/16 353/85 |
| 2008/0042578 | A1* | 2/2008 | Arai | ..................... G09G 3/3426 315/32 |
| 2009/0190095 | A1* | 7/2009 | Ellinger | ............. G02B 27/2207 353/7 |
| 2009/0244405 | A1 | 10/2009 | Yamamoto et al. | |

(Continued)

FOREIGN PATENT DOCUMENTS

| JP | A-05-026635 | 2/1993 |
| JP | A-2004-258547 | 9/2004 |
| JP | A-2005-121890 | 5/2005 |

(Continued)

*Primary Examiner* — Bao-Luan Le
*Assistant Examiner* — Christopher Lamb, II
(74) *Attorney, Agent, or Firm* — Oliff PLC

(57) ABSTRACT

A projector includes a first light source group having a plurality of solid-state light sources, a second light source group having a plurality of solid-state light source, and emitting light having a peak wavelength on a longer wavelength side of that of the first light source group, a first regulation section adapted to cool the first light source group, a second regulation section adapted to cool the second light source group, and a control device adapted to control the first regulation section and the second regulation section, and the first regulation section and the second regulation section are controlled so as to approximate the peak wavelengths of the lights emitted respectively from the first light source group and the second light source group to each other when forming a two-dimensional image, or to make the peak wavelengths get further from each other when forming a three-dimensional image.

3 Claims, 14 Drawing Sheets

(56) References Cited

U.S. PATENT DOCUMENTS

| | | |
|---|---|---|
| 2010/0110533 A1 | 5/2010 | Kusukame et al. |
| 2010/0149494 A1* | 6/2010 | Kawachi ............ H05B 33/0803 353/57 |
| 2011/0285962 A1* | 11/2011 | Ellinger ............. G02B 27/2207 353/7 |

FOREIGN PATENT DOCUMENTS

| | | |
|---|---|---|
| JP | A-2007-156483 | 6/2007 |
| JP | A-2008-145486 | 6/2008 |
| JP | A-2009-086274 | 4/2009 |
| WO | WO 2007/040089 A1 | 4/2007 |
| WO | WO 2009/081577 A1 | 7/2009 |

\* cited by examiner

IMAGE DISPLAY DEVICE

BACKGROUND

1. Technical Field

The present invention relates to an image display device.

2. Related Art

In the past, a projector provided with a light source, a light modulation device for modulating the light emitted from the light source, and a projection optical device for projecting the light thus modulated on a projection surface such as a screen in an enlarged manner has been known as an image display device. As such a projector, there is known a projector, which performs temperature control of a solid-state light source adopted as the light source (see, e.g., JP-A-2007-156438 (Document 1)).

The projector described in Document 1 is provided with each of the solid-state light sources respectively emitting colored lights of red, green, and blue, and in addition, there are disposed temperature detection devices (temperature sensors) provided respectively to these solid-state light sources, and for detecting the temperature of the solid-state light sources, and temperature regulation devices (fans) for regulating the temperature of the solid-state light sources.

Here, the solid-state light sources each have an output wavelength varying in accordance with the temperature change. For example, in the case in which the temperature of the solid-state light source rises, the peak wavelength of the light to be output is shifted to the longer wavelength side, and in the case in which the temperature falls, the peak wavelength is shifted to the shorter wavelength side. To cope with such a variation of the output wavelength as described above, the projector suppresses the variation of the output wavelength by suppressing the temperature change by controlling the temperature regulation device so that the temperature of the light source is kept at the set temperature in accordance with the temperature of the light source detected by the temperature detection device.

Incidentally, even in the case of the solid-state light source manufactured so as to have a predetermined wavelength peak, a shift in the peak wavelength due to the individual difference may occur in some cases even if the solid-state light sources are lit in the same conditions.

Therefore, in the case of adopting a plurality of solid-state light sources for the light source device for the purpose of increasing the luminance of the light to be emitted, it is difficult for the configuration of the temperature regulation device described in Document 1 mentioned above to perform the temperature control in accordance with each of the solid-state light sources, and there is a problem that it is difficult to correct the shift of the peak wavelength between the solid-state light sources.

SUMMARY

An advantage of some aspects of the invention is to provide an image display device capable of appropriately regulating the temperature of the solid-state light source.

An aspect of the invention is directed to an image display device which is adapted to display an image corresponding to image information input, and includes a light source device, a light modulation device adapted to modulate light emitted from the light source device to form the image, a temperature regulation device adapted to regulate temperature of the light source device, and a control device adapted to control the temperature regulation device, the light source device includes a first solid-state light source adapted to emit light having a peak wavelength in at least one of wavelength bands of red, green, and blue, and a second solid-state light source adapted to emit light having a peak wavelength in the wavelength band and on a longer wavelength side of the peak wavelength of the light emitted from the first solid-state light source, the temperature regulation device includes a first regulation section adapted to regulate temperature of the first solid-state light source, and a second regulation section adapted to regulate temperature of the second solid-state light source, and the control device separately controls the first regulation section and the second regulation section to make the first regulation section regulate the temperature of the first solid-state light source, and make the second regulation section regulate the temperature of the second solid-state light source.

Here, for example, the wavelength band of red is a wavelength band of 610 through 760 nm, the wavelength band of green is a wavelength band of 500 through 560 nm, and the wavelength band of blue is a wavelength band of 435 through 480 nm.

According to this aspect of the invention described above, among the first solid-state light source and the second solid-state light source for emitting the lights categorized into the same colored light, the second solid-state light source has the peak wavelength on the longer wavelength side of the first solid-state light source, and the temperature of the first solid-state light source and the temperature of the second solid-state light source are separately regulated by the first regulation section and the second regulation section, respectively under the control of the control device. Therefore, the temperature of each of the solid-state light sources can individually and appropriately be regulated.

In the aspect of the invention described above, it is preferable that there is further included a temperature detection device adapted to detect the temperature of at least one of the first solid-state light source and the second solid-state light source, and the control device makes the first regulation section and the second regulation section respectively regulate the temperature of the first solid-state light source and the temperature of the second solid-state light source based on a detection result by the temperature detection device.

According to the configuration described above, since the temperature regulation of the first solid-state light source by the first regulation section and the temperature regulation of the second solid-state light source by the second regulation section are performed based on the detection result by the temperature detection device, the temperature regulation corresponding to the actual temperature of the first solid-state light source and the actual temperature of the second solid-state light source can be performed. Further, according to this configuration, the temperature of the first solid-state light source and the temperature of the second solid-state light source can be controlled to the desired temperature levels. Therefore, the peak wavelength of the light output from each of the solid-state light sources can reliably be tuned to the desired wavelength.

Further, in the aspect of the invention described above, it is preferable that the control device includes an image determination section adapted to determine whether the image information is information including a first image or information including a second image and a third image different from each other, and a regulation control section adapted to control the temperature regulation device based on a determination result by the image determination section, and the regulation control section controls the first regulation section and the second regulation section to regulate the temperature of the first solid-state light source and the temperature of the second solid-state light source so that the peak wavelength of the first solid-state light source and the peak wavelength of the second solid-state light source approximate each other in a case in which the image determination section determines that the image information is the information including the first image, and controls the first regulation section and the second regulation section to regulate the temperature of the first solid-state light source and the temperature of the second solid-state light source so that the peak wavelength of the first solid-state light source and the peak wavelength of the second solid-state light source get further from each other in a case in which the image determination section determines that the image information is the information including the second image and the third image.

It should be noted that the first image can be exemplified by an image for forming a two-dimensional image, and the second image and the third image can be exemplified by a left-eye image and a right-eye image as parallax images and images having no relationship with each other.

According to the configuration described above, in the case of forming the first image, by performing the temperature regulation by the temperature regulation device, the peak wavelength of the first solid-state light source and the peak wavelength of the second solid-state light source are made to approximate to each other. According to this configuration, since the light having a roughly unique peak wavelength can be emitted, the loss of the light in the process of forming the image with the light thus output can be suppressed, and thus, the first image with high luminance can be formed.

Further, in the case of forming the second image and the third image, the peak wavelength of the first solid-state light source and the peak wavelength of the second solid-state light source are made to get further from each other. According to this configuration, by forming the second image with the light emitted from the first solid-state light source and forming the third image with the light emitted from the second solid-state light source, it is possible to make it easy to separate the second image and the third image from each other based on the wavelengths of the lights for forming the respective images.

Further, in the aspect of the invention described above, it is preferable that the first regulation section includes a heat radiator body connected to the first solid-state light source, and the second regulation section includes a heat radiator body connected to the second solid-state light source, the temperature regulation device includes a medium delivery section adapted to deliver a cooling medium to the heat radiator body connected to the second solid-state light source and the heat radiator body connected to the first solid-state light source, and the heat radiator body connected to the second solid-state light source is disposed upstream of the heat radiator body connected to the first solid-state light source in a flow path of the cooling medium delivered by the medium delivery section.

It should be noted that as the medium delivery section, a variety of air cooling devices such as a fan can be cited in the case in which the cooling medium is air, further, a variety of liquid cooling devices such as a pump can be cited in the case in which the cooling medium is a cooling fluid such as ethylene glycol or water.

Here, the peak wavelength of the second solid-state light source is longer than the peak wavelength of the first solid-state light source. Further, since the first solid-state light source and the second solid-state light source generate heat due to the light emission, the wavelength of the light emitted from each of the solid-state light source is apt to be shifted toward the longer wavelength side. Therefore, when controlling the temperature of the first solid-state light source and the temperature of the second solid-state light source, a higher cooling efficiency is required for the second solid-state light source than that of the first solid-state light source.

To cope with the above, by disposing the heat radiator body connected to the second solid-state light source upstream in the flow path of the cooling medium, the cooling efficiency of the second solid-state light source can be set higher compared to that of the first solid-state light source. Therefore, the temperature regulation of the second solid-state light source can appropriately be performed.

Further, in the case of the configuration of displaying the first image described above, the second solid-state light source having the peak wavelength on the longer wavelength side compared to the first solid-state light source can efficiently be cooled, and therefore, it is possible to make it easy to approximate the output wavelength of the light emitted from each of the first solid-state light source and the second solid-state light source to a desired output wavelength.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be explained with reference to the accompanying drawings.

Schematic Configuration of Image Display System

Figure 1:
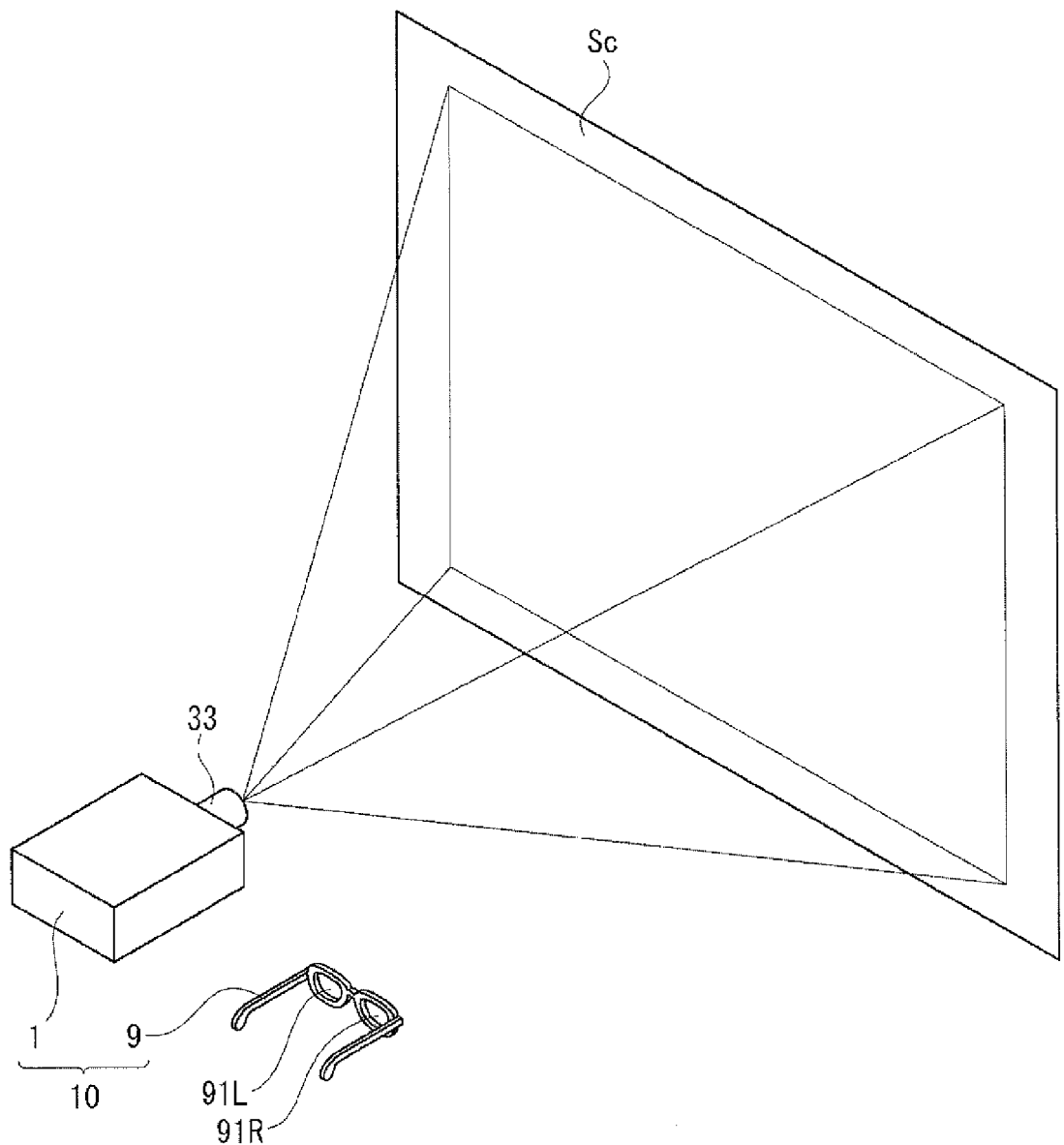
FIG. 1 is a schematic diagram showing an image display system according to a first embodiment of the invention.

FIG. 1 is a schematic diagram showing an image display system 10 according to the present embodiment.

As shown in FIG. 1, the image display system 10 according to the present embodiment is provided with a projector 1 as an image display device for projecting an image on a projection surface of a screen Sc to thereby display the image, and a pair of glasses 9 to be worn by the observer.

Among these constituents, the projector 1 is configured so as to be able to switch between the case of displaying a two-dimensional image as a first image and the case of alternately displaying a second image and a third image. As such a second image and a third image, a right-eye image and a left-eye image as parallax images to each other can be cited as an example. Further, in the case in which the right-eye image and the left-eye image are displayed alternately, the image, which can be viewed stereoscopically due to parallax (hereinafter referred to as a "three-dimensional image"), can be observed by observing the respective images via the pair of glasses 9.

Configuration of Glasses

The pair of glasses 9 is worn by the observer when displaying the three-dimensional image described above, and has a function of making the right-eye image enter the right eye of the observer and making the left-eye image enter the left eye of the observer. The pair of glasses 9 is provided with a left-eye selection section 91L disposed in accordance with the left eye of the observer and a right-eye selection section 91R disposed in accordance with the right eye of the observer. Further, the left-eye selection section 91L has a bandpass filter capable of transmitting red light, green light, and blue light forming the left-eye image described later, and the right-eye selection section 91R similarly has a bandpass filter capable of transmitting red light, green light, and blue light forming the right-eye image. Although the details are described later, each of the red light, the green light, and the blue light is different in wavelength between the left-eye image and the right-eye image.

By observing the three-dimensional image thus displayed via such a pair of glasses 9, the left-eye image transmitted through the left-eye selection section 91L is input to the left eye of the observer, and the right-eye image transmitted through the right-eye selection section 91R is input to the right eye of the observer. Thus, it is possible to observe the left-eye image with the left eye and the right-eye image with the right eye to thereby visually recognize the three-dimensional image.

Configuration of Projector

Figure 2:
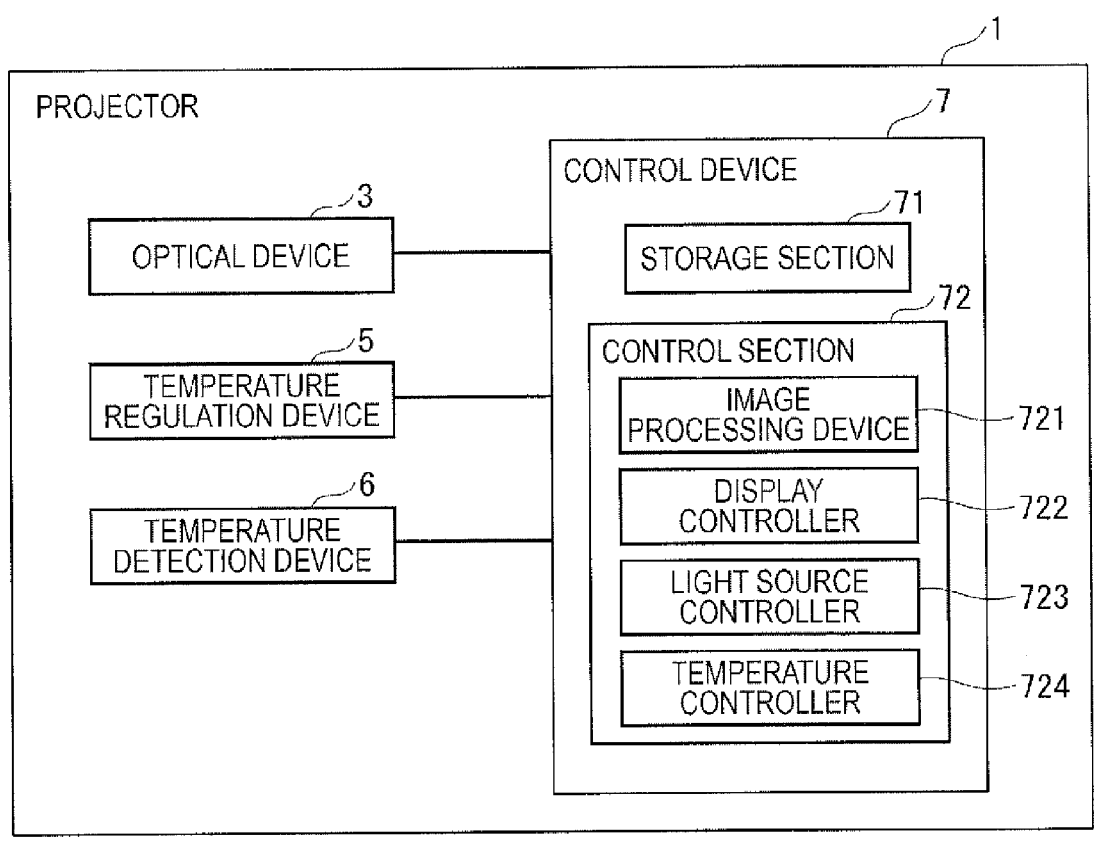
FIG. 2 is a block diagram showing a configuration of a projector according to the first embodiment.
Figure 3:
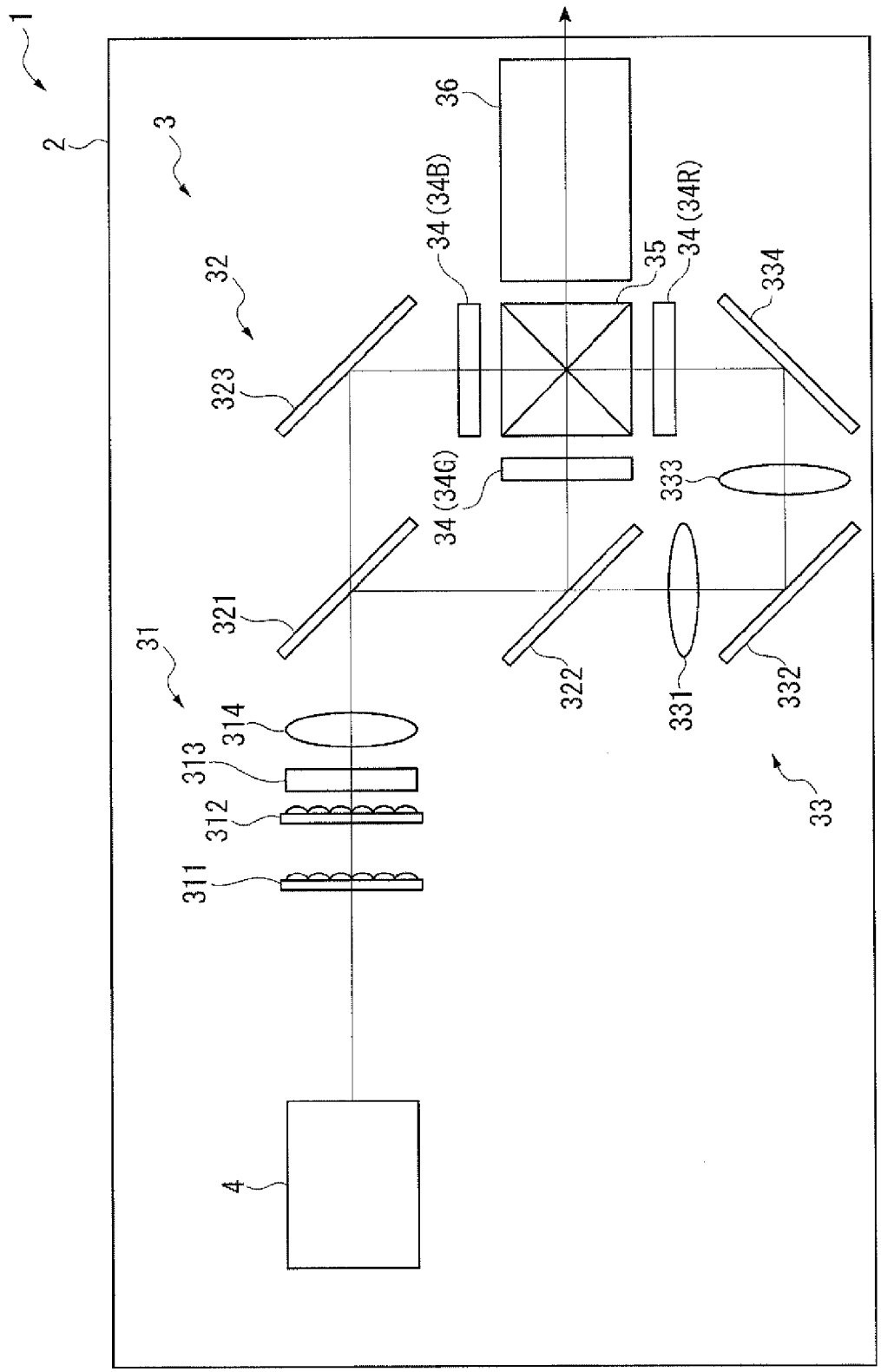
FIG. 3 is a schematic diagram showing the configuration of the projector according to the first embodiment.

FIG. 2 is a block diagram showing a configuration of the projector 1. Further, FIG. 3 is a schematic diagram showing the configuration of the projector 1.

The projector 1 modulates the light emitted from a light source device 4 to thereby from an image corresponding to image information, and then projects the image on the projection surface described above in an enlarged manner. The projector 1 is provided with a housing 2 and an optical device 3 housed in the housing 2. Further, as shown in FIG. 2, the projector 1 is provided with a temperature regulation device 5 for regulating the temperature of a component of the projector 1 to appropriate temperature, a temperature detection device 6 for detecting the temperature of the light source device 4 provided to an optical device 3, and a control device 7 for controlling the projector 1. It should be noted that although not shown in the drawings, the projector 1 is provided with, for example, a power supply device for supplying electronic components of the projector 1 with electrical power.

Configuration of Optical Device

The optical device 3 forms the image corresponding to a drive signal input from the control device 7, and then projects the image. As shown in FIG. 3, the optical device 3 has the light source device 4, a uniform illumination device 31, a color separation device 32, a relay device 33, light modulation devices 34, a color combining device 35, and a projection optical device 36.

Among these components, the light source device 4 emits the light including the blue light, the green light, and the red light toward the uniform illumination device 31. It should be noted that a configuration of the light source device 4 will be described later in detail.

The uniform illumination device 31 uniformizes the illuminance in the plane orthogonal to the light axis of the light input from the light source device 4, and thus roughly uniformly illuminates an image forming area of each of the light modulation devices 34 described later. The uniform illumination device 31 is provided with a first lens array 311, a second lens array 312, a polarization conversion element 313, and an overlapping lens 314.

The color separation device 32 separates the colored lights of red (R), green (G), and blue (B) from the light input from the uniform illumination device 31. The color separation device 32 is provided with a dichroic mirror 321 for transmitting the blue light and reflecting the green light and the red light, a dichroic mirror 322 for reflecting the green light toward the light modulation device 34 (34G) for the green light, and transmitting the red light, and a total reflecting mirror 323 for reflecting the blue light input thereto to thereby guide the blue light to the light modulation device 34 (34B) for the blue light.

The relay device 33 is for guiding the red light, which has been transmitted through the dichroic mirror 322, to the light modulation device 34 (34R) for the red light, and is provided with an entrance side lens 331, a relay lens 333, and total reflection mirrors 332, 334.

The light modulation devices 34 (the light modulation device for the red light, the light modulation device for the green light, and the light modulation device for the blue light are denoted with 34R, 34G, and 34B, respectively) respectively modulate the incident light to thereby form the image corresponding to the drive signal described above. Although not shown in detail, these light modulation devices 34 are each configured as a liquid crystal light valve provided with a liquid crystal panel driven in accordance with the image signal, and a pair of polarization plates sandwiching the liquid crystal panel.

The color combining device 35 is formed of a cross dichroic prism, and combines modulated lights (images) of the respective colored lights input from the respective light modulation devices 34 to thereby form full-color image light.

The projection optical device 36 projects the image light thus combined by the color combining device 35 on the projection surface in an enlarged manner. Although not shown in detail, the projection optical device 36 is configured as a combination lens having a body tube and a plurality of lenses arranged in the body tube.

Configuration of Light Source Device

Figure 4:
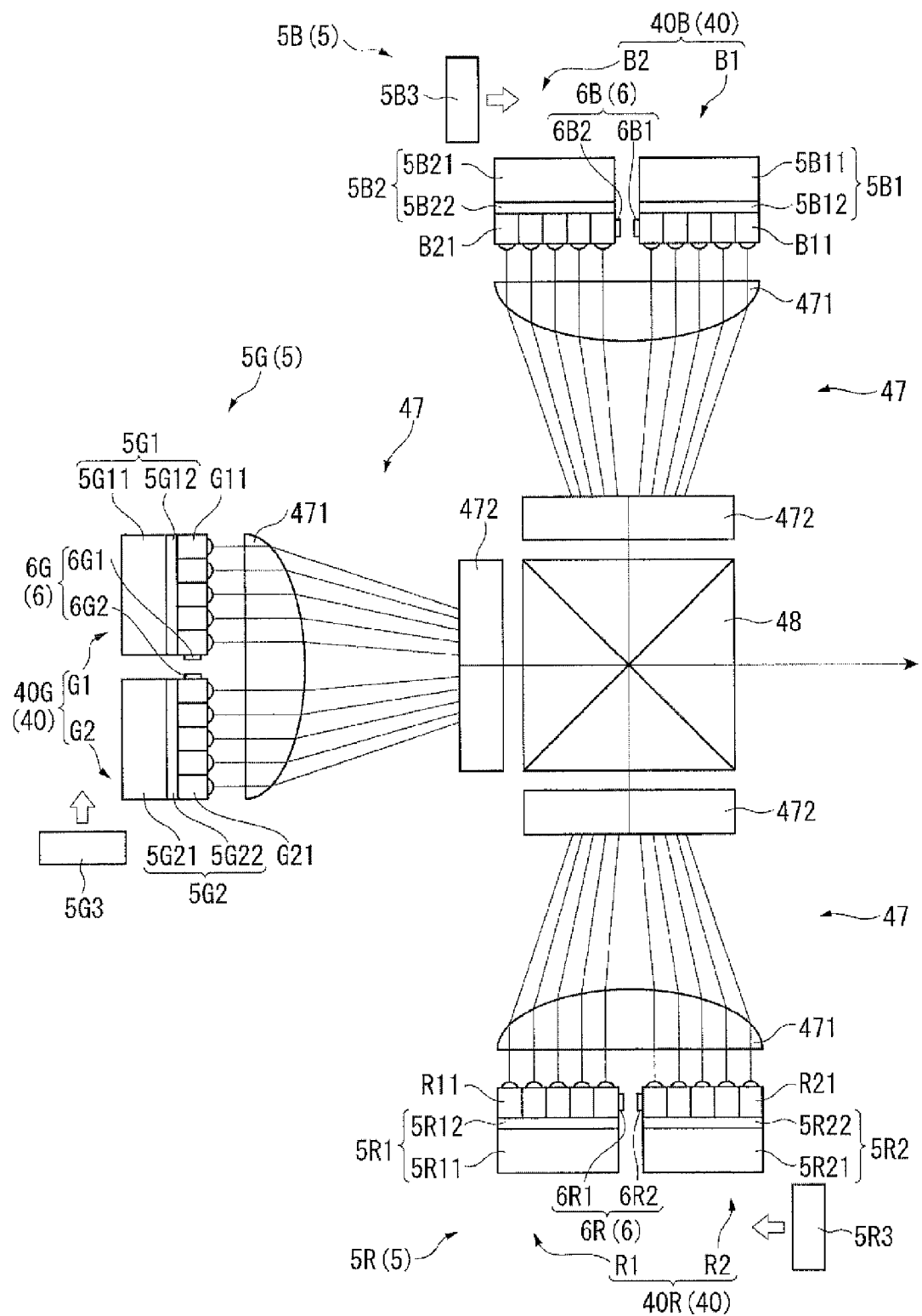
FIG. 4 is a schematic diagram showing a configuration of a light source device in the first embodiment.

FIG. 4 is a schematic diagram showing a configuration of the light source device 4.

As described above, the light source device 4 emits the light including the red light, the green light, and the blue light to the uniform illumination device 31. As shown in FIG. 4, the light source device 4 has three light source units 40, three collecting devices 47, and one cross dichroic prism 48.

Among these components, the cross dichroic prism 48 is formed of a prism similar to the color combining device 35 described above, and has three planes of incidence of light through which the red light, the green light, and the blue light are respectively input, and a single light exit surface through which the light obtained by combining these colored lights is emitted.

Each of the collecting devices 47 is disposed between the corresponding one of the light source units 40 and the plane of incidence of light of the cross dichroic prism 48, the plane of incidence of light corresponding to the light source unit 40. These collecting devices 47 are each provided with a collecting lens 471 for collecting the light input from the corresponding one of the light source units 40, and a collimating lens 472 for collimating the light collected by the collecting lens 471, and then making the light enter the corresponding one of the planes of incidence of light.

The three light source units 40 correspond to a red unit 40R for emitting the red light, a green unit 40G for emitting the green light, and a blue unit 40B for emitting the blue light.

These light source units 40R, 40G, and 40B have substantially the same configurations except the point that the wavelength of the light to be emitted is different, and therefore, the blue unit 40B will be explained below, and the explanation of the other units 40R, 40G will be omitted.

The blue unit 40B is provided with a first light source group B1 disposed on one end side in the orthogonal direction to the center axis of the light emitted from the blue unit 40B, and a second light source group B2 disposed on the other end side. Among these components, the first light source group B1 has first solid-state light sources B11 as a plurality of solid-state light sources arranged in a matrix, and similarly, the second light source group B2 has second solid-state light sources B21 as a plurality of solid-state light sources arranged in a matrix. In the present embodiment, a laser diode (LD) is adopted as the first solid-state light sources B11 and the second solid-state light sources B21.

The first solid-state light sources B11 and the second solid-state light sources B21 each emit the light in the wavelength band categorized into the same colored light, namely the blue light. However, the wavelength band of the blue light emitted by the first solid-state light sources B11 and the wavelength band of the blue light emitted by the second solid-state light sources B21 are different from each other.

Figure 5:
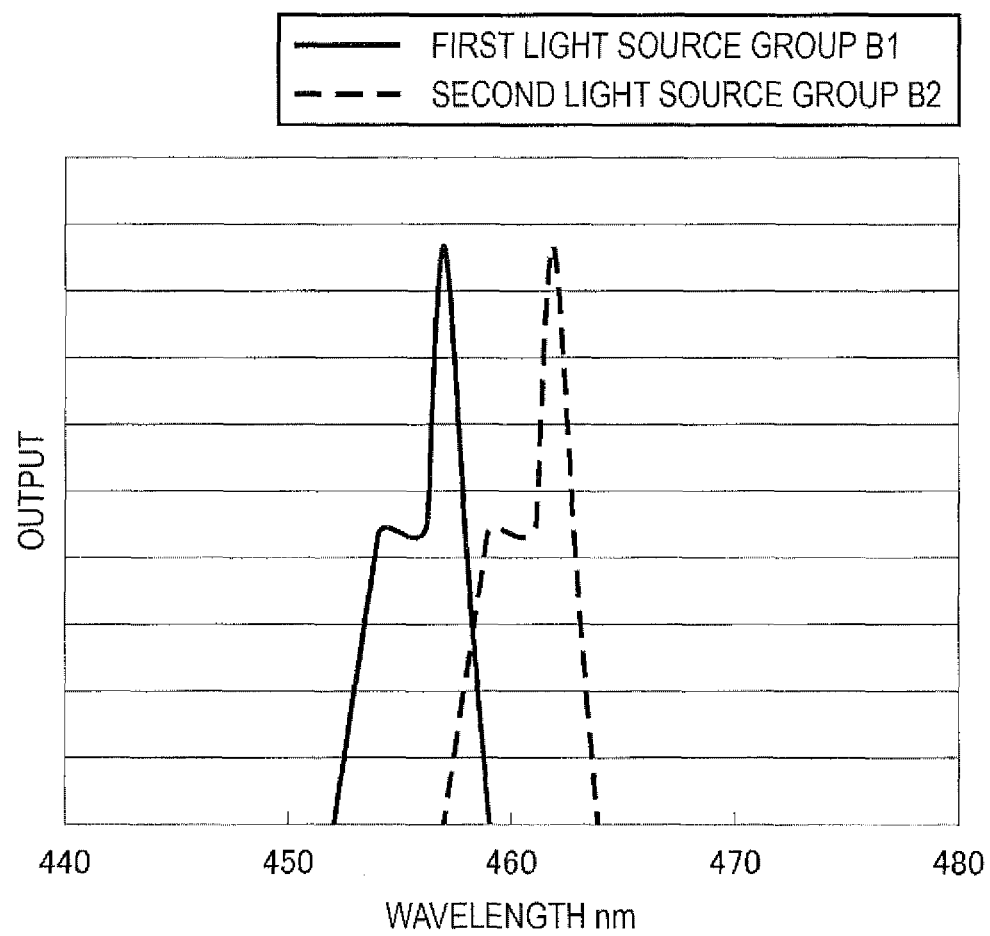
FIG. 5 is a graph showing output wavelengths of a first light source group and a second light source group for blue light in the first embodiment.

FIG. 5 is a graph showing the output wavelengths of the blue lights emitted from the first solid-state light sources B11 and the second solid-state light sources B21, respectively. It should be noted that in FIG. 5, the output wavelength of the blue light emitted from the first solid-state light sources B11 is indicated by the solid line, and the output wavelength of the blue light emitted from the second solid-state light sources B21 is indicated by the dotted line.

Specifically, as shown in FIG. 5, in the case of lighting the first solid-state light sources B11 and the second solid-state light sources B21 in the same conditions (at the same temperature, and with the same power), the first solid-state light sources B11 emit the blue light shifted to a shorter wavelength side compared to that of the second solid-state light sources B21. In other words, the wavelength band of the blue light emitted by the second solid-state light sources B21 is shifted to a longer wavelength side compared to the wavelength band of the blue light emitted by the first solid-state light sources B11.

In order to configure the first light source group B1 and the second light source group B2 having the output wavelength relationship described above, for example, the individuals each having a peak wavelength on the shorter wavelength side of a reference wavelength in each of the color regions are selected as the first solid-state light sources B11 from a plurality of solid-state light sources lit in the same conditions, and the individuals each having a peak wavelength on the longer wavelength side are selected as the second solid-state light sources B21. Then, the first solid-state light sources B11 are combined to each other to constitute the first light source group B1, and the second solid-state light sources B21 are combined to each other to constitute the second light source group B2.

It should be noted that the reference wavelength can take any value providing the plurality of solid-state light sources can be separated into the solid-state light sources for the first light source group having the peak wavelengths on the shorter wavelength side and the solid-state light sources for the second light source group having the peak wavelengths on the longer wavelength side. For example, the reference wavelength can be set to a design value of the peak wavelength in each of the colors of the solid-state light sources in the manufacturing process, a desired peak wavelength when driving the solid-state light sources in predetermined drive conditions, or an average value of the peak wavelength in each of the colors when driving the solid-state light sources in predetermined conditions. Further, the wavelength band of the first light source group B1 and the wavelength band of the second light source group B2 can partially overlap each other, or can completely be separated from each other.

The red unit 40R and the green unit 40G are also provided with substantially the same configuration and arrangement as those of the blue unit 40B.

Specifically, the red unit 40R is provided with a first light source group R1 disposed on one end side in the orthogonal direction to the center axis of the light emitted, and having a plurality of first solid-state light sources R11 arranged, and a second light source group R2 disposed on the other end side and having a plurality of solid-state light sources R21 arranged. Further, the wavelength band of the red light emitted by the second solid-state light sources R21 is shifted to a longer wavelength side compared to the wavelength band of the red light emitted by the first solid-state light sources R11.

Further, the green unit 40G is provided with a first light source group G1 disposed on one end side in the orthogonal direction to the center axis of the light emitted, and having a plurality of first solid-state light sources G11 arranged, and a second light source group G2 disposed on the other end side and having a plurality of second solid-state light sources G21 arranged. Further, the wavelength band of the green light emitted by the second solid-state light sources G21 is shifted to a longer wavelength side compared to the wavelength band of the green light emitted by the first solid-state light sources G11.

Configuration of Temperature Regulation Device

The temperature regulation device 5 corresponds to a temperature regulation device according to the invention, and is provided with a red temperature regulation section 5R for regulating the temperature of the red unit 40R, a green temperature regulation section 5G for regulating the temperature of the green unit 40G, and a blue temperature regulation section 5B for regulating the temperature of the blue unit 40B as shown in FIG. 4.

Among these components, the blue temperature regulation section 5B has a first regulation section 5B1 for regulating the temperature of the first light source group B1, a second regulation section 5B2 for regulating the temperature of the second light source group B2, and a fan 5B3.

The first regulation section 531 corresponds to a first regulation section according to the invention, and has a heat receiving body (not shown) to which the heat is conducted from each of the first solid-state light sources B11, a heatsink 5B11 as a heat radiator body, and a Peltier element 5B12 as a heat conductor element for conducting the heat, which has been conducted to the heat receiving body, to the heatsink 5B11.

Similarly, the second regulation section 5B2 corresponds to a second regulation section according to the invention, and has a heat receiving body (not shown) to which the heat is conducted from each of the second solid-state light sources B21, a heatsink 5B21 as a heat radiator body, and a Peltier element 5B22 as a heat conductor element for conducting the heat, which has been conducted to the heat receiving body, to the heatsink 5B21.

As shown in FIG. 4, the Peltier elements 5B12, 5B22 absorb the heat from the heat receiving bodies disposed on the surfaces of the first and second light source groups B1, B2, the surfaces being opposite to the light exit surfaces of the first and second light source groups B1, B2, and then conduct the heat to the heatsinks 5B11, 5B21, respectively.

The heatsinks 5B11, 5B21 are disposed on the surfaces of the Peltier elements 5B12, 5B22, the surfaces being opposite to the first and second light source groups B1, B2 side, respectively. These heatsinks 5B11, 5B21 are disposed on a flow path of cooling air delivered from the fan 533.

The fan 5B3 corresponds to a medium delivering section according to the invention, and delivers the air as a cooling medium to the heatsinks 5B11, 5B21 to thereby cool the heatsinks 5B11, 5B21, and further, the first solid-state light sources B11 and the second solid-state light sources B21.

Here, on the flow path of the cooling air delivered from the fan 5B3, the heatsink 5B21 is located upstream of the heatsink 5B11. Therefore, in the case in which the same voltage is applied to the Peltier elements 5B12, 5B22, the cooling efficiency of the second regulation section 5B2 is higher than that of the first regulation section 5B1. In other words, the fan 5B3 is disposed so that the cooling efficiency of the second solid-state light sources B21 becomes higher than that of the first solid-state light sources B11.

It should be noted that the red temperature regulation section 5R and the green temperature regulation section 5G each have substantially the same configuration as that of the blue temperature regulation section 5B.

Specifically, the red temperature regulation section 5R is provided with a first regulation section 5R1 having a heat receiving body (not shown) to be connected to the first light source group R1, a heatsink 5R11, and a Peltier element 5R12, a second regulation section 5R2 having a heat receiving body (not shown) to be connected to the second light source group R2, a heatsink 5R21, and a Peltier element 5R22, and a fan 5R3. Further, among the heatsinks 5R11, 5R21 located on a flow path of cooling air delivered from the fan 5R3, the heatsink 5R21 is located upstream.

Further, the green temperature regulation section 5G is provided with a first regulation section 5G1 having a heat receiving body (not shown) to be connected to the first light source group G1, a heatsink 5G11, and a Peltier element 5G12, a second regulation section 5G2 having a heat receiving body (not shown) to be connected to the second light source group G2, a heatsink 5G21, and a Peltier element 5G22, and a fan 5G3. Further, among the heatsinks 5G11, 5G21 located on a flow path of cooling air delivered from the fan 5G3, the heatsink 5G21 is located upstream.

Configuration of Temperature Detection Device

As shown in FIG. 4, the temperature detection device 6 is provided with a red detection section 6R for detecting the temperature of the red unit 40R, a green detection section 6G for detecting the temperature of the green unit 40G, and a blue detection section 6B for detecting the temperature of the blue unit 40B.

Among these components, the blue detection section 6B is provided with a first detection section 6B1 for detecting the temperature of the first light source group B1 and a second detection section 6B2 for detecting the temperature of the second light source group B2, and these detection sections 6B1, 6B2 are disposed on surfaces (e.g., side surfaces) of the corresponding light source groups B1, B2 other than the planes of incidence of light, respectively.

Further, the red detection section 6R is also provided with a first detection section 6R1 and a second detection section 6R2, and detects the temperature of the first light source group R1 and the temperature of the second light source group R2, respectively. Similarly, the green detection section 6G is also provided with a first detection section 6G1 and a second detection section 6G2, and detects the temperature of the first light source group G1 and the temperature of the second light source group G2, respectively.

Then, the temperature detection device 6 outputs the detection result obtained by these detection sections 6R, 6G, and 6B to the control device 7.

Configuration of Control Device

The control device 7 shown in FIG. 2 is formed as a circuit board having circuit components such as a central processing unit (CPU), a random access memory (RAM), and a flash memory mounted thereon, and controls the entirety of the projector 1. The control device 7 is provided with a storage section 71 formed of the RAM and the flash memory described above, and a control section 72.

The storage section 71 stores various programs and data for controlling the projector 1. For example, the storage section 71 stores a program and data for performing a temperature control process described later.

The control section 72 is realized by the CPU processing the program and the data stored in the storage section 71. As shown in FIG. 2, the control section 72 is provided with an image processing device 721, a display controller 722, a light source controller 723, and a temperature controller 724 as a functional section.

The image processing device 721 processes, for example, image information (including data and a signal) received from the outside of the projector 1, and then draws the image corresponding to the image information in a frame memory (not shown). Such image information is formed of an aggregate of data each representing one frame, and includes sync signals (a vertical sync signal and a horizontal sync signal). It should be noted that the image data of a three-dimensional image includes the data of a left-eye image and the data of a right-eye image. Therefore, whether the image information received is the information of a two-dimensional image or the information (the information including a left-eye image and a light-eye image) of a three-dimensional image can be determined.

The display controller 722 outputs drive signals based on the images drawn by the image processing device 721 to the light modulation devices 34 to thereby form the image. On this occasion, in the case in which the image information received is the information of a three-dimensional image, the display controller 722 alternately outputs the drive signals based on the left-eye image and the drive signals based on the right-eye image out of the images thus drawn, to thereby alternately form the left-eye image and the right-eye image.

The light source controller 723 controls lighting of the light source device 4.

Specifically, in the case in which the image information received is the information of a two-dimensional image, and the two-dimensional image is to be displayed, the light source controller 723 lights all of the first light source groups R1, G1, and B1 and the second light source groups R2, G2, and B2.

In contrast, in the case in which the image information is the information of a three-dimensional image, and the three-dimensional image is to be displayed, the light source controller 723 lights either one of the first light source groups R1, G1, and B1 and the second light source groups R2, G2, and B2 during a period in which the left-eye image is formed by the light modulation devices 34, and lights the other during a period in which the right-eye image is formed, based on the sync signals described above.

The temperature controller 724 controls the operation of the temperature regulation device 5.

Specifically, the temperature controller 724 separately controls the first regulation section and the second regulation section of each of the temperature regulation sections 5R, 5G, and 5B based on the detection result of the detection sections 6R, 6G, and 6B described above, and separately cools the first light source group and the second light source group of each of the light source units 40R, 40G, and 40B, which are the temperature regulation objects of the temperature regulation sections 5R, 5G, and 5B, to thereby control the temperature of the first light source group and the temperature of the second light source group.

Such temperature control by the temperature controller 724 will be described later in detail.

Temperature Control Process when Displaying Two-Dimensional Image

The solid-state light sources constituting the light source device 4 described above have common characteristics that the output wavelength is shifted toward the longer wavelength side as the temperature rises, but is shifted toward the shorter wavelength side as the temperature falls, in contrast.

Therefore, in the projector 1 according to the present embodiment, making use of the characteristics described above, in the case in which the image information described above is the information of a two-dimensional image, the temperature regulation device 5 is controlled in order to regulate the temperature so as to approximate the wavelength band of the light output from the first light source group and the wavelength band of the light output from the second light source group to each other in each of the light source units 40R, 40G, and 40B.

In other words, in the case of displaying a two-dimensional image, in order to set the wavelength band of the light emitted from the first light source group to a predetermined wavelength band, the projector 1 controls the temperature regulation device 5 so that the temperature of the first light source group is kept in a predetermined value corresponding to the predetermined wavelength band. Further, in order to set the wavelength band of the light emitted from the second light source group to the predetermined wavelength band, the projector 1 controls the temperature regulation device 5 so that the temperature of the second light source group is kept in a predetermined value corresponding to the predetermined wavelength band.

Thus, it is possible to make the wavelength band of the light emitted from the first light source group and the wavelength band of the light emitted from the second light source group equal or approximate to each other.

Figure 6:
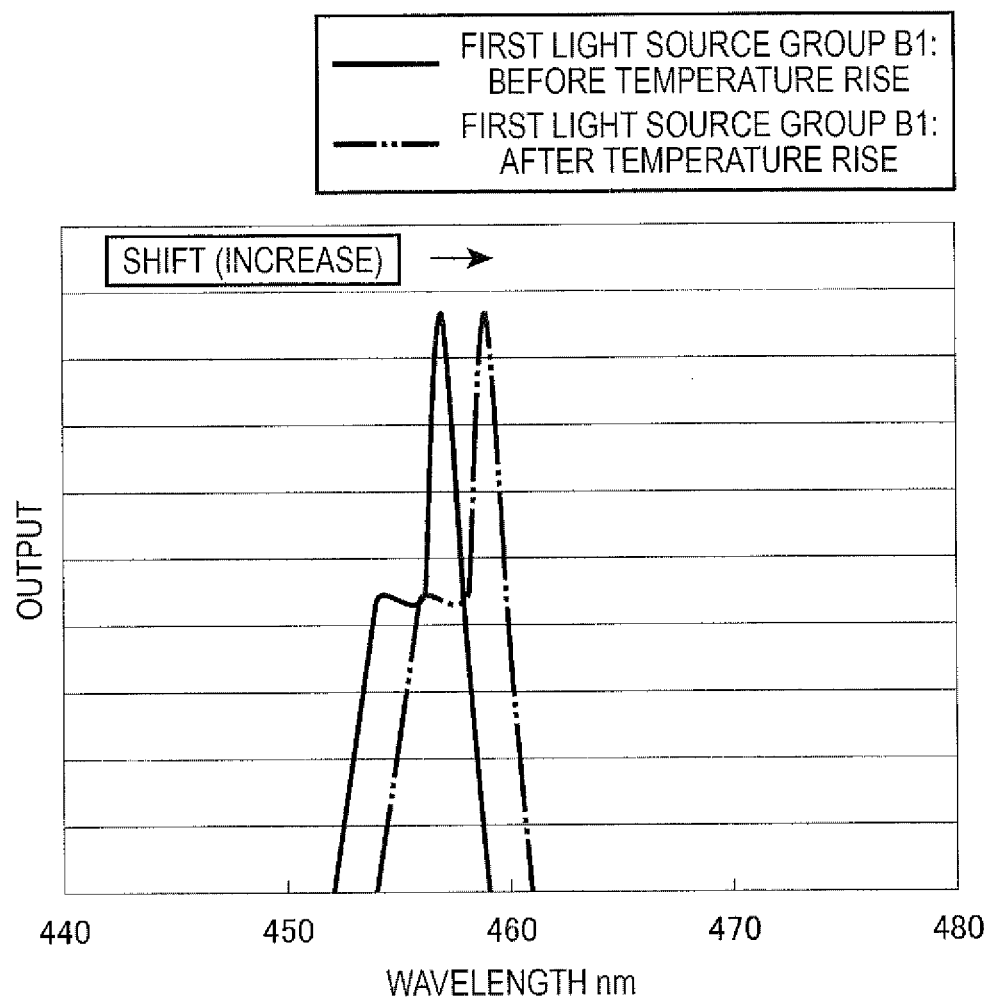
FIG. 6 is a graph showing an output wavelength variation of the first light source group for the blue light in the first embodiment.

FIG. 6 shows the state in which the output wavelength of the first light source group B1 is shifted toward the longer wavelength side due to the rise in temperature. In FIG. 6, the output wavelength of the first light source group B1 before the rise in temperature is indicated by the solid line, and the output wavelength after the rise in temperature is indicated by the dashed-two dotted line.

Specifically, the temperature controller 724 controls the first regulation section 5B1 and the fan 5B3 in order to raise the temperature of the first light source group B1 to predetermined temperature so as to shift the output wavelength of the first light source group B1 toward the longer wavelength side to thereby shift the peak wavelength thereof from the initial peak wavelength (e.g., about 457 nm) to a preset wavelength (e.g., about 460 nm).

In other words, the temperature controller 724 controls the first regulation section 5B1 and the fan 5B3 to raise the temperature of the first light source group B1 while detecting the temperature by the first detection section 6B1 so that the temperature reaches the predetermined preset temperature at which the peak wavelength of the first light source group B1 becomes the preset wavelength described above. The preset temperature is stored in the storage section 71 in advance.

Figure 7:
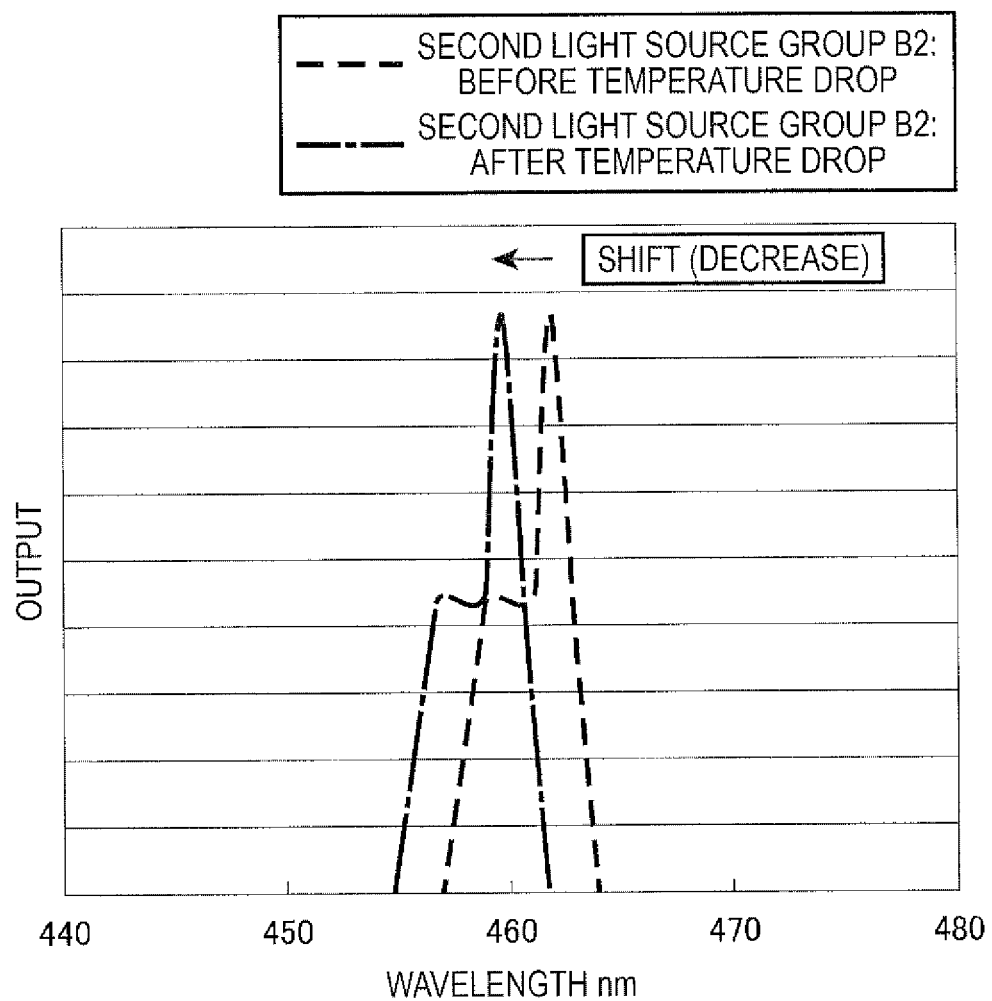
FIG. 7 is a graph showing an output wavelength variation of the second light source group for the blue light in the first embodiment.

FIG. 7 shows the state in which the output wavelength of the second light source group B2 is shifted toward the shorter wavelength side due to the drop in temperature. In FIG. 7, the output wavelength of the second light source group B2 before the drop in temperature is indicated by the dotted line, and the output wavelength after the drop in temperature is indicated by the dashed-dotted line.

Further, the temperature controller 724 controls the second regulation section 5B2 in order to drop the temperature of the second light source group B2 to predetermined temperature so as to shift the output wavelength of the second light source group B2 toward the shorter wavelength side to thereby shift the peak wavelength thereof from the initial peak wavelength (e.g., about 462 nm) to a preset wavelength (e.g., about 460 nm).

In other words, the temperature controller 724 controls the second regulation section 5B2 to drop the temperature of the second light source group B2 while detecting the temperature by the second detection section 6B2 so that the temperature reaches the predetermined preset temperature at which the peak wavelength of the second light source group B2 becomes the preset wavelength described above. The preset temperature is also stored in the storage section 71 in advance.

Further, the temperature controller 724 also performs substantially the same temperature control as in the first light source group B1 on the first light source group G1 and the first light source group R1 to thereby shift the respective peak wavelengths toward the longer wavelength side so as to reach the respective preset wavelengths. At the same time, the temperature controller 724 also performs substantially the same temperature control as in the second light source group B2 on the second light source group G2 and the second light source group R2 to thereby shift the respective peak wavelengths toward the shorter wavelength side so as to reach the respective preset wavelengths. For example, the output wavelength of the first light source group G1 is shifted toward the longer wavelength side so that the peak wavelength thereof is shifted from the initial peak wavelength of 545 nm to the preset peak wavelength of 550 nm, and the output wavelength of the second light source group G2 is shifted toward the shorter wavelength side so that the peak wavelength thereof is shifted from the initial peak wavelength of 555 nm to the preset peak wavelength of 550 nm. Further, for example, the output wavelength of the first light source group R1 is shifted toward the longer wavelength side so that the peak wavelength thereof is shifted from the initial peak wavelength of 615 nm to the preset peak wavelength of 620 nm, and the output wavelength of the second light source group R2 is shifted toward the shorter wavelength side so that the peak wavelength thereof is shifted from the initial peak wavelength of 625 nm to the preset peak wavelength of 620 nm. It should be noted that the initial peak wavelengths denote the peak wavelengths obtained in the case of lighting the first light source group and the second light source group described above in the same conditions.

According to the temperature control process described above, it is possible to make the wavelength of the light emitted from the first light source group and the wavelength of the light emitted from the second light source group roughly coincide with each other in each of the light source units 40R, 40G, and 40B. Alternatively, even in the case in which the wavelength band of the light emitted from the first light source group and the wavelength band of the light emitted from the second light source group fail to coincide with each other in some part by such a temperature control process as described above, at least the difference between the peak wavelength of the light emitted from the first light source group and the peak wavelength of the light emitted from the second light source group can be made smaller than the difference between the respective initial peak wavelengths.

Temperature Control Process when Displaying Three-Dimensional Image

In the projector 1 according to the present embodiment, in the case in which the image information described above is the information of a three-dimensional image, in order to improve the separation capacity between the left-eye image and the right-eye image, making use of the characteristics described above, the temperature regulation device 5 is controlled in order to regulate the temperature thereof so as to make the wavelength band of the light output from the first light source group and the wavelength band of the light output from the second light source group get further from each other in each of the light source units 40R, 40G, and 40B.

In other words, in the case of displaying a three-dimensional image, in order to set the wavelength band of the light emitted from the first light source group to a predetermined wavelength band, the projector 1 controls the temperature regulation device 5 so that the temperature of the first light source group is kept in a predetermined value corresponding to the predetermined wavelength band. Further, in order to set the wavelength band of the light emitted from the second light source group to a predetermined wavelength band different from the wavelength band of the light emitted from the first light source group, the projector 1 controls the temperature regulation device 5 so that the temperature of the second light source group is kept in a predetermined value corresponding to the predetermined wavelength band.

Figure 8:
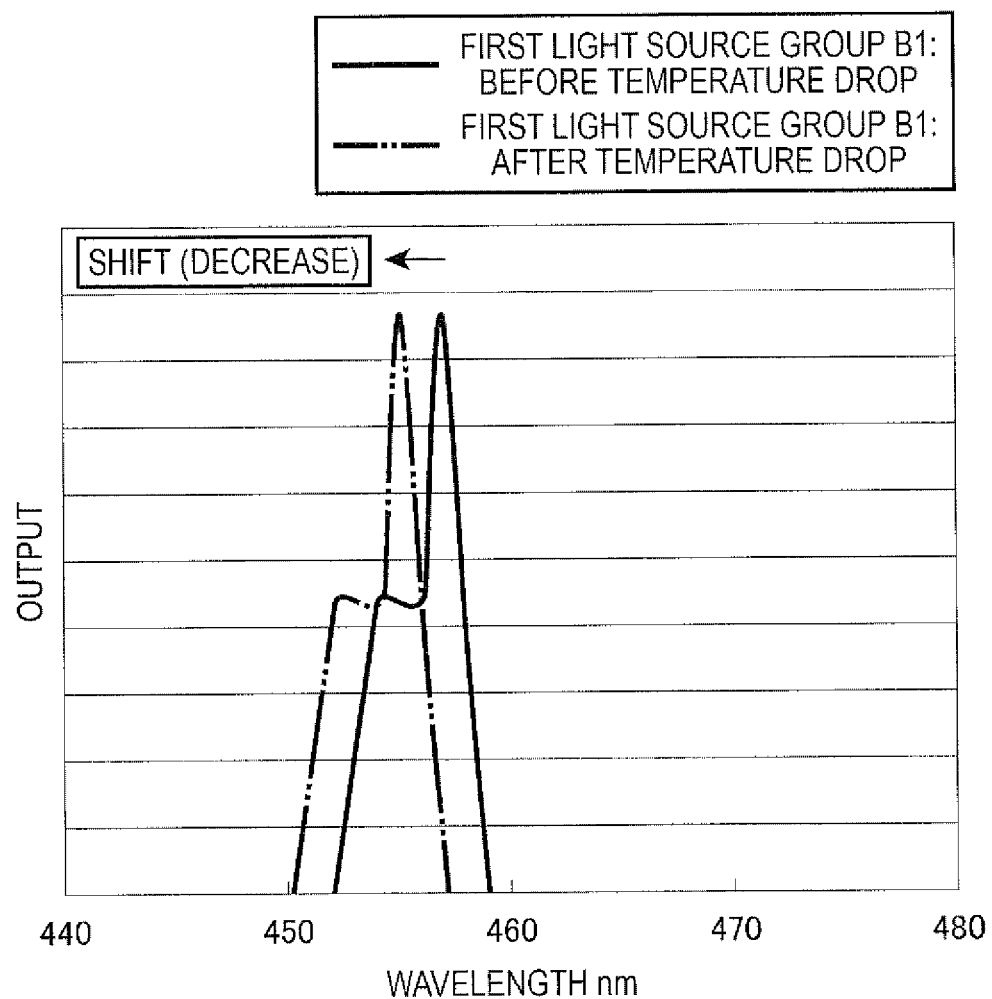
FIG. 8 is a graph showing an output wavelength variation of the first light source group for the blue light in the first embodiment.

FIG. 8 shows the state in which the output wavelength of the first light source group B1 is shifted toward the shorter wavelength side due to the drop in temperature. In FIG. 8, the output wavelength of the first light source group B1 before the drop in temperature is indicated by the solid line, and the output wavelength after the drop in temperature is indicated by the dashed-two dotted line.

Specifically, the temperature controller 724 controls the first regulation section 5B1 in order to drop the temperature of the first light source group B1 to predetermined temperature so as to shift the output wavelength of the first light source group B1 toward the shorter wavelength side to thereby shift the peak wavelength thereof to a preset wavelength (e.g., about 455 nm).

In other words, the temperature controller 724 controls the first regulation section 5B1 to drop the temperature of the first light source group B1 while detecting the temperature by the first detection section 6B1 so that the temperature reaches the predetermined preset temperature at which the peak wavelength of the first light source group B1 becomes the preset wavelength described above. The preset temperature is stored in the storage section 71.

Further, the temperature controller 724 also performs the temperature control on the first light source group R1 and the first light source group G1 in a similar manner so that the respective peak wavelengths become predetermined wavelengths (e.g., about 610 nm for the first light source group R1, and about 540 nm for the first light source group G1).

Figure 9:
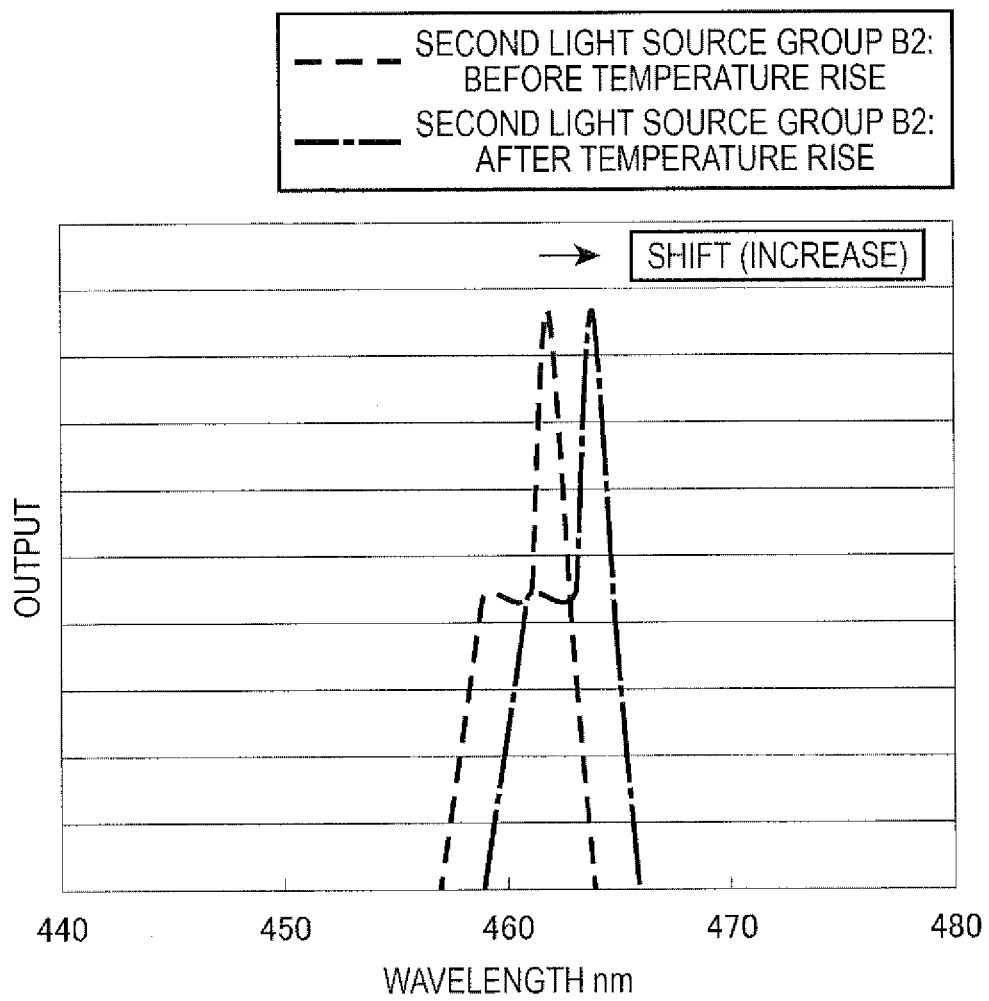
FIG. 9 is a graph showing an output wavelength variation of the second light source group for the blue light in the first embodiment.

FIG. 9 shows the state in which the output wavelength of the second light source group B2 is shifted toward the longer wavelength side due to the rise in temperature. In FIG. 9, the output wavelength of the second light source group B2 before the rise in temperature is indicated by the dotted line, and the output wavelength after the rise in temperature is indicated by the dashed-dotted line.

The temperature controller 724 controls the second regulation section 5B2 in order to raise the temperature of the second light source group B2 to predetermined temperature so as to shift the output wavelength of the second light source group B2 toward the longer wavelength side to thereby shift the peak wavelength thereof to a preset wavelength (e.g., about 464 nm).

In other words, the temperature controller 724 controls the second regulation section 5B2 to raise the temperature of the second light source group B2 while detecting the temperature by the second detection section 6B2 so that the temperature reaches the predetermined preset temperature at which the peak wavelength of the second light source group B2 becomes the preset wavelength described above. The preset temperature is also stored in the storage section 71.

Further, the temperature controller 724 also performs the temperature control on the first light source group R1 and the first light source group G1 in a similar manner so that the respective peak wavelengths become predetermined wavelengths (e.g., about 630 nm for the first light source group R1, and about 560 nm for the first light source group G1).

As described above, the output wavelength of the first light source group is shifted toward the shorter wavelength side, and at the same time, the output wavelength of the second light source group is shifted toward the longer wavelength side. As a result, it is possible to make the respective output wavelengths of the first light source group and the second light source group get further from each other. Alternatively, even in the case in which the wavelength band of the light emitted from the first light source group and the wavelength band of the light emitted from the second light source group partially overlap each other by such a temperature control process as described above, at least the difference between the peak wavelength of the light emitted from the first light source group and the peak wavelength of the light emitted from the second light source group can be made larger than the difference between the respective peak wavelengths when forming the two-dimensional image.

The right-eye selection section 91R of the pair of glasses 9 described above has a bandpass filter for transmitting the lights within predetermined ranges centered on the peak wavelengths (blue: 455 nm, green: 540 nm, and red: 610 nm) of the respective colors of the right-eye image formed by modulating the lights emitted by the respective first light source groups.

Further, the left-eye selection section 91L of the pair of glasses 9 described above has a bandpass filter for transmitting the lights within predetermined ranges centered on the peak wavelengths (blue: 464 nm, green: 560 nm, and red: 630 nm) of the respective colors of the left-eye image formed by modulating the lights emitted by the respective second light source groups.

By the right-eye image entering the right eye of the observer wearing such a pair of glasses 9 and the left-eye image entering the left eye thereof, the image displayed is visually recognized as the three-dimensional image.

According to the projector 1 of the present embodiment explained hereinabove, the following advantages can be obtained.

Specifically, the projector 1 has the first light source group B1 and the second light source group B2 for emitting the light having the peak wavelength on the longer wavelength side of the peak wavelength of the light emitted from the first light source group B1. The first light source group B1 and the second light source group B2 are separately cooled by the first regulation section 5B1 and the second regulation section 5B2, respectively. According to this configuration, the temperature of the first light source group B1 and the temperature of the second light source group B2 are individually regulated by the first regulation section 5B1 and the second regulation section 5B2, respectively. The same applies to other colors. Therefore, the temperature of each of the light source groups can appropriately be regulated.

Further, the first light source group B1 and the second light source group B2 have the respective output wavelengths different from each other, but are configured so that the temperature control can be performed independently of each other. Therefore, the temperature control can be performed so as to make the respective peak wavelengths approximate to each other, and by performing such control, it is possible to make the respective peak wavelengths of the first light source group B1 and the second light source group B2 equal or approximate to each other. The same applies to other colors. Therefore, it is possible to center the output wavelength of the light emitted from the light source device 4 on a desired wavelength of each of the colors. In other words, it is possible to regulate the peak wavelength of each of the colored lights to a desired wavelength (a preset wavelength). As a result, the luminance and the chroma of the image light can be improved. In, for example, International Commission on Illumination (CIE), the color-matching function and the tristimulus values X, Y, and Z for representing the chromatic (spectral) sensitivity of the human eyes are defined. If the energy is the same, the closer to the peaks of the tristimulus values X, Y, and Z the wavelength is, the higher the chromatic (spectral) sensitivity of the human eyes becomes. Regarding the chromatic (spectral) sensitivity of the human eyes, the peak wavelength of Z (blue) is about 445 nm, the peak wavelength of Y (green) is about 555 nm, and the peak wavelength of X (red) is about 600 nm. Further, the peak of the relative luminous efficiency as the sensitivity of the luminance is about 555 nm, which is the same as that of Y (green). Since it is necessary to consider the color reproducibility and the chromatic coordinate of white in the products, all of the colors are not necessarily set to the peaks of the tristimulus values. However, by centering the wavelength on the desired wavelength, the chroma of the color of the desired wavelength is enhanced, and therefore, the color reproducibility closer to the design value can be realized.

Further, the projector 1 has the configuration of performing the temperature control for each of the light source groups instead of performing the temperature control independently on all of the solid-state light sources. Therefore, the control can be simplified and the device configuration can also be simplified compared to the case of performing the temperature control independently on all of the solid-state light sources. Therefore, according to the projector 1 of the present embodiment, the cost can be reduced, and at the same time, the system can be simplified.

Further, the projector 1 is provided with the temperature detection device for detecting at least either one of the first light source group and the second light source group in each of the colors.

Thus, in, for example, the blue unit 40B, the temperature control corresponding to the actual temperature of at least one of the first light source group B1 and the second light source group B2 can be performed. Further, according to this configuration, the temperature of the first light source group B1 and the second light source group B2 can be regulated to the desired temperature. The same applies to other colors. Therefore, the peak wavelength of the light output from each of the light source groups can reliably be tuned to the desired wavelength.

Further, even in the case in which a change in environment such as a change in room temperature or the temperature of the inside of the housing occurs, the desired temperature regulation can be performed to thereby suppress the deterioration of the image quality due to the environmental changes.

It should be noted that in particular in the present embodiment, the temperature detection devices are provided respectively to the first light source group and the second light source group. Thus, since the temperature of each of the light source groups can be detected, the desired temperature regulation can more reliably be performed.

Further, the projector 1 determines whether the image information is the information of a two-dimensional image or the information of a three-dimensional image using the image processing device 721, and then controls the temperature regulation device 5 based on the determination result using the temperature controller 724. Specifically, in the case of the information of a two-dimensional image, the temperature is regulated so as to make the peak wavelength of the first light source group B1 and the peak wavelength of the second light source group B2 approximate to each other. In contrast, in the case of the information of a three-dimensional image, the temperature is regulated so as to make the peak wavelength of the first light source group B1 and the peak wavelength of the second light source group B2 get further from each other. The same applies to other colors.

As described above, in the case of forming the two-dimensional image, by approximating the peak wavelength of the first light source group and the peak wavelength of the second light source group to each other, the light having a roughly unique peak wavelength in the wavelength band of each of the colors can be emitted, and therefore, the loss of the light in the process of forming the image using the output light can be suppressed, and the two-dimensional image with high luminance can be formed.

Further, in the case of forming the three-dimensional image, by making the peak wavelength of the first light source group for forming the right-eye image (the second image) and the peak wavelength of the second light source group for forming the left-eye image (the third image) get further from each other, it is possible to make the right-eye image and the left-eye image easy to separate by the wavelength of the light forming the image. The separation can be performed in a reliable manner. Thus, the deterioration of the image quality (crosstalk) due to the mixture of the right-eye image and the left-eye image can be reduced.

Further, in the projector 1, the first regulation section 5B1 and the second regulation section 5B2 are respectively provided with the heatsink 5B11 and the heatsink 5B21 as the heat radiator bodies, and the heatsink 5B21 is disposed upstream of the heatsink 5B11 in the airflow of the cooling air formed by the fan 5B3. The same applies to other colors.

As described above, the peak wavelength of the second solid-state light sources is longer than the peak wavelength of the first solid-state light sources, and moreover, these peak wavelengths are apt to be shifted toward the longer wavelength side due to the heat generation of the solid-state light sources. Therefore, when regulating the temperature of the first light source group and the temperature of the second light source group, a higher cooling efficiency is required for the second light source group than that of the first light source group.

Therefore, in the projector 1 configured as described above, the cooling efficiency of the second solid-state light sources can be set to be higher than that of the first solid-state light sources, and thus, the temperature regulation of the second solid-state light sources can appropriately be performed.

First Modified Example of First Embodiment

In each of the light source units 40 of the light source device 4 described above, the first light source group is disposed on one end side in the orthogonal direction to the center axis of the light emitted by the light source unit 40, and the second light source group is disposed on the other end side.

Here, when displaying a three-dimensional image, the light emitted from one of the first light source group and the second light source group is used for the left-eye image, and in the case of forming the right-eye image, the light emitted from the other of the light source groups is used. In the case in which there is a biased arrangement distribution in a horizontal or vertical direction between the first light source group and the second light source group, and thus, a difference in the propagation path through which the light emitted from each of the light source groups passes, and an angular characteristics of the display element (caused by the pretilt angle and so on in the case of the liquid crystal panel) exist as described above, a difference in the light intensity and the in-plane luminance distribution of the light, which is emitted from each of the light source groups and reaches the screen, occurs between the light source groups. Therefore, according to the arrangement of the first light source group and the second light source group, there is a possibility that a luminance variation is caused in the left-eye image and the right-eye image.

To cope with the above, it is possible to adopt the configuration described below to thereby inhibit the luminance variation from occurring. It should be noted that in the explanation below, a part which is the same or substantially the same as the part having already been explained is denoted with the same reference symbol, and the explanation thereof will be omitted.

Figure 10:
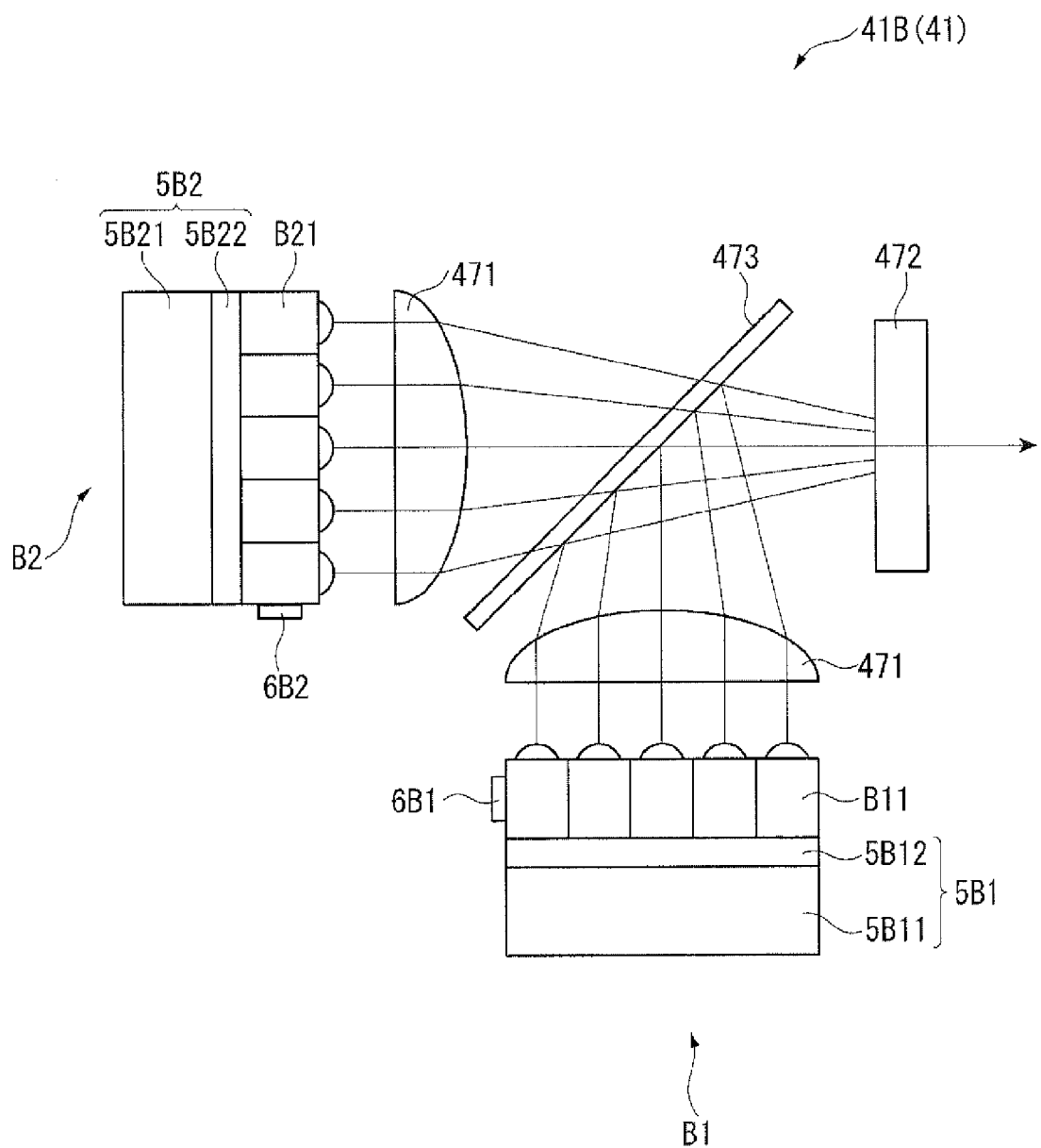
FIG. 10 is a schematic diagram showing a configuration of a modified example of the light source unit in the first embodiment.

FIG. 10 is a schematic diagram showing a light source unit 41 as a first modified example of the light source unit 40. It should be noted that FIG. 10 shows a blue unit 41B as the light source unit 41 for the blue color.

There are disposed three light source units 41, namely the red unit, the green unit, and the blue unit, similarly to the case of the light source units 40.

As shown in FIG. 10, the blue unit 41B is provided with a half mirror 473 in addition to the first light source group B1 and the collecting lens 471, the second light source group B2 and the collecting lens 471, and the collimating lens 472. Further, the first light source group B1 and the second light source group B2 are arranged so that the center axes of the lights emitted respectively from the light source groups B1, B2 intersect with each other at a right angle on the half mirror 473.

Further, the light, which has been emitted from the first light source group B1, and then transmitted through the collecting lens 471, is then transmitted through the half mirror 473, and then enters the collimating lens 472. Further, the light, which has been emitted from the second light source group B2, and then transmitted through the collecting lens 471, is then reflected by the half mirror 473, and then enters the collimating lens 472.

Then, the collimating lens 472 collimates the light thus input thereto, and the light thus collimated enters the corresponding one of the planes of incidence of light of the cross dichroic prism 48 described above.

Other light source units (the red unit and the green unit) are also provided with substantially the same configuration as that of the blue unit 41B described above.

According to such a light source unit 41 as described above, since the lights emitted from the first light source group B1 and the second light source group B2 enter the same area in the plane of incidence of light described above in an overlapping manner, it is possible to make it easy to uniformize the illuminance in the plane orthogonal to the light axis of the light emitted from the light source unit 41. Further, since the light is further uniformized by the uniform illumination device, the image forming area in the light modulation device 34 can uniformly be illuminated with the light. Therefore, the luminance variation can be inhibited from occurring in the image displayed.

It should be noted that the detection sections of the temperature detection device 6 and the first regulation section and the second regulation section of the temperature regulation device 5 are disposed for each of the first light source group and the second light source group similarly to the case of the light source unit 40 described above. Further, the control device 7 performs the temperature control substantially the same as described above on the first light source group and the second light source group.

Further, the fan 5B3 (not shown in FIG. 10) of the temperature regulation device 5 is disposed so that the heatsink to which the heat from the second light source group is conducted is located upstream of the heatsink to which the heat is conducted from the first light source group. Further, the flow path of the cooling air for cooling the first light source group B1 and the second light source group B2 is formed by a straightening device such as a duct not shown.

Second Modified Example of First Embodiment

Figure 11:
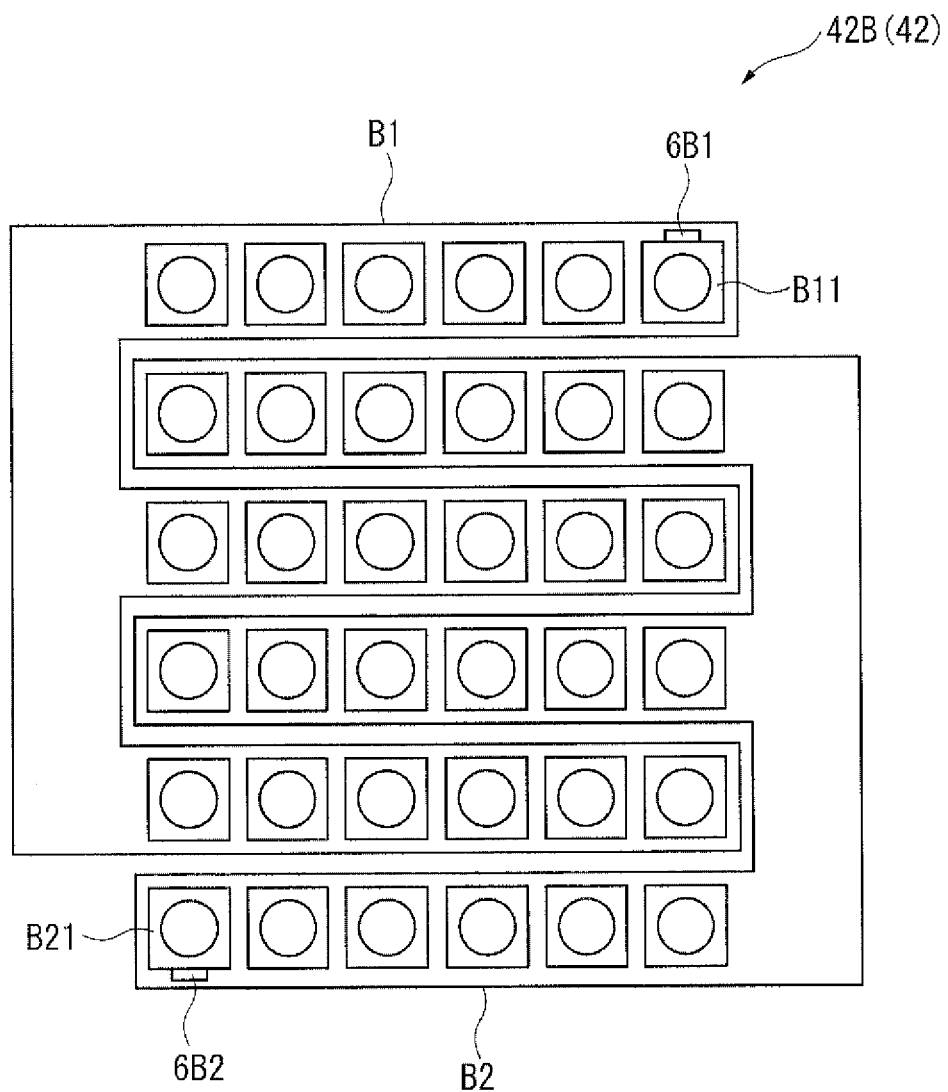
FIG. 11 is a schematic diagram showing a configuration of the modified example of the light source unit in the first embodiment.

FIG. 11 is a schematic diagram showing a light source unit 42 as a second modified example of the light source unit 40. It should be noted that FIG. 11 shows a blue unit 42B as the light source unit 42 for the blue color.

Further, in the projector 1 descried above, it is also possible to adopt the light source units 42 shown in FIG. 11 instead of the light source units 40.

In the light source unit 42, columns each having the first solid-state light sources B11 constituting the first light source group B1 arranged, and columns each having the second solid-state light sources B21 constituting the second light source group B2 arranged are arranged alternately along the orthogonal direction to the center axis of the light emitted from the light source unit 42 as the blue unit 42B shown in FIG. 11.

Specifically, in the example shown in FIG. 11, the first light source group B1 has a configuration in which the first solid-state light sources B11 are arranged on the substrate having a roughly E shape, and the second light source group B2 has a configuration in which the second solid-state light sources B21 are arranged on the substrate having a roughly inverted E shape. Further, the first light source group B1 and the second light source group B2 are combined with each other so that the columns of the first solid-state light sources B11 and the columns of the second solid-state light sources B21 are arranged alternately in a direction perpendicular to the longitudinal direction of the columns, and it is arranged that the plane orthogonal to the light axis of the light emitted from the first solid-state light sources B11 and the second solid-state light sources B21 has a roughly rectangular shape. The lights emitted from the first light source group B1 and the second light source group B2 enter the corresponding one of the planes of incidence of light of a color unit via the collecting lens 471 and the collimating lens 472 described above.

It should be noted that other light source units (the red unit and the green unit) are also provided with substantially the same configuration as that of the blue unit 42B described above.

According to such a light source unit 42 as described above, since the arrangement distribution of the first solid-state light sources B11 and the arrangement distribution of the second solid-state light sources B21 overlap each other in the same area, and the light having the illuminance in the plane orthogonal to the light axis described above roughly uniformized can be emitted from each of the light source units 42, it is possible to uniformly illuminate the image forming area of the light modulation device 34 similarly to the case of adopting the light source units 41 described above. Therefore, the luminance variation can be inhibited from occurring in the image formed and then displayed.

Further, in each of the light source units 42, since the first light source group B1 and the second light source group B2 can intensively be arranged, miniaturization of the light source units 42 can be achieved.

It should be noted that the detection sections of the temperature detection device 6 and the first regulation section and the second regulation section of the temperature regulation device 5 are disposed for each of the first light source group and the second light source group similarly to the case of the light source unit 40 described above, and the control device 7 performs the temperature control substantially the same as described above.

Third Modified Example of First Embodiment

Figure 12:
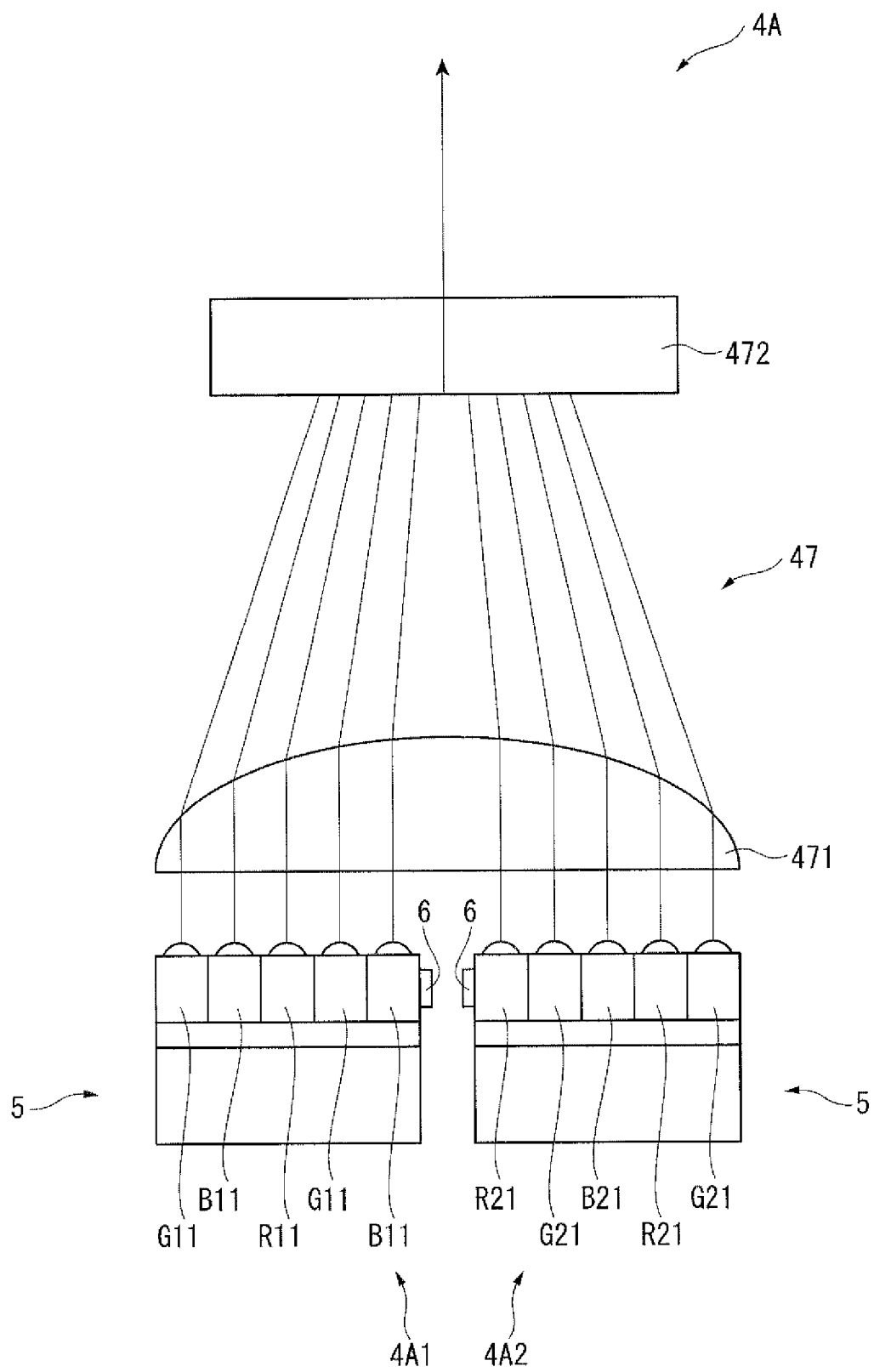
FIG. 12 is a schematic diagram showing a configuration of a modified example of the light source device in the first embodiment.

FIG. 12 is a schematic diagram showing a light source device 4A, which is a modification of the light source device 4.

Further, in the projector 1 described above, the light source device 4A shown in FIG. 12 can be adopted instead of the light source device 4. As shown in FIG. 12, the light source device 4A is provided with a first light source group 4A1, a second light source group 4A2, the collecting lens 471, and the collimating lens 472.

Among these components, the first light source group 4A1 has first solid-state light sources R11, G11, and B11 arranged in a matrix. Similarly, the second light source group 4A2 has second solid-state light sources R21, G21, and B21 arranged in a matrix. The solid-state light sources in each of the first light source group 4A1 and the second light source group 4A2 can be arranged based on a predetermined arrangement rule, or can be arranged in a random manner. Further, the number and the proportions of the solid-state light sources in each of the first light source group 4A1 and the second light source group 4A2 can also be changed arbitrarily.

In the case of adopting such a light source device 4A as described above, the configuration of the light source device can be simplified, and further, the manufacturing cost can be reduced compared to the case of providing the light source units 40 corresponding respectively to the colors of red, green, and blue. Further, since it is not necessary to perform the temperature control of the first light source group 4A1 and the second light source group 4A2 for each of the colored lights of red, green, and blue, the process of the temperature control can be simplified.

It should be noted that in such a light source device 4A as described above, it is also possible to arrange the first light source group 4A1 and the second light source group 4A2 similarly to the first light source group and the second light source group in the light source unit 42.

Second Embodiment

Hereinafter, a second embodiment of the invention will be explained.

Although the image display system according to the present embodiment is provided with substantially the same configuration as that of the image display system described above, the image display system according to the present embodiment and the image display system 10 according to the first embodiment are different from each other in the point that the configuration of the light source device of the projector adopted by the image display system is different. It should be noted that in the explanation below, a part which is the same or substantially the same as the part having already been explained is denoted with the same reference symbol, and the explanation thereof will be omitted.

Figure 13:
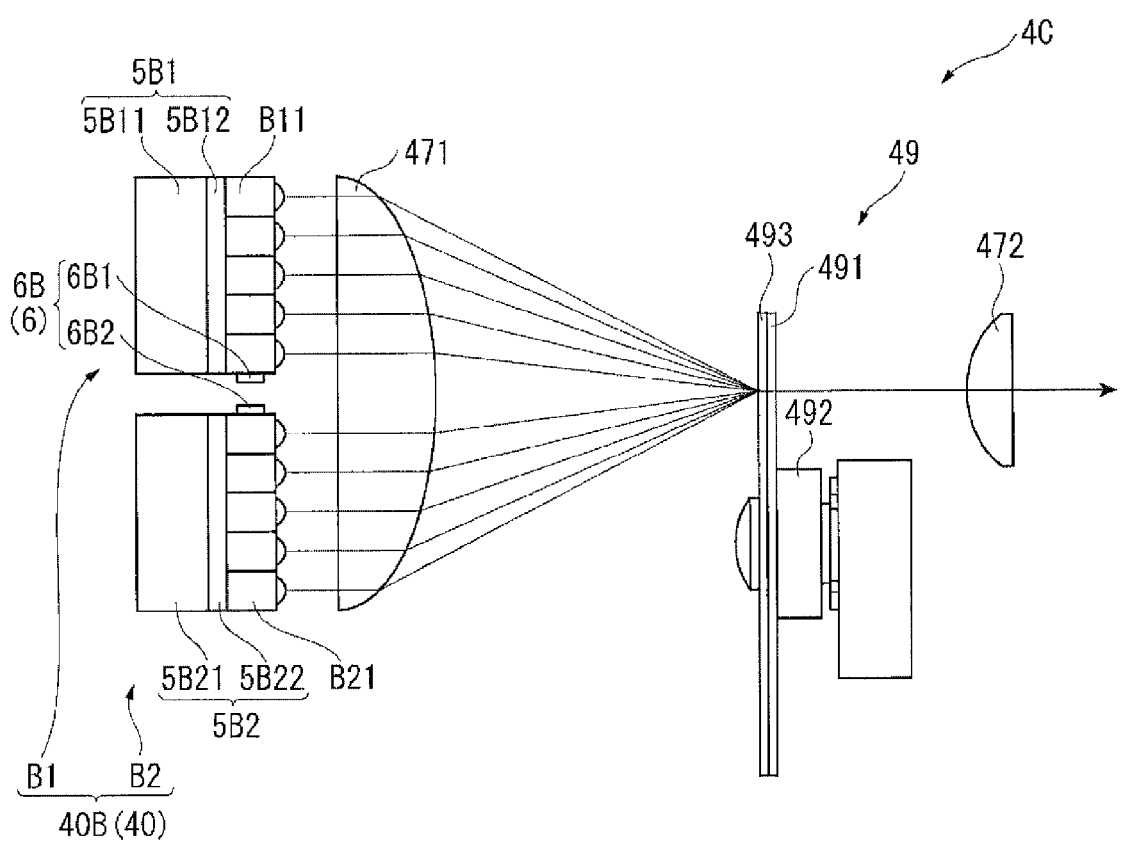
FIG. 13 is a schematic diagram showing a configuration of a light source device in a second embodiment of the invention.

FIG. 13 is a schematic diagram showing a configuration of a light source device 4C adopted by a projector of an image display system according to the present embodiment.

The image display system according to the present embodiment is provided with substantially the same configuration as that of the image display system 10 described above. Here, in the image display system 10 according to the first embodiment, the light source device 4 having the solid-state light sources for emitting the colored lights of red, green, and blue is adopted. In contrast, the projector of the image display system according to the present embodiment is provided with the light source device 4C having solid-state light sources for emitting the blue light and a fluorescent body for emitting the red light and the green light by being irradiated with the blue light.

Specifically, as shown in FIG. 13, the light source device 4C is provided with the blue unit 40B, the collecting lens 471, a wavelength conversion device 49, and the collimating lens 472.

The blue light emitted from the blue unit 40B is collected by the collecting lens 471, and then enters the wavelength conversion device 49. Further, the light emitted from the wavelength conversion device 49 is collimated by the collimating lens 472, and then enters the uniform illumination device 31 described above.

The wavelength conversion device 49 converts the wavelength of a part of the incident light, and then outputs the light thus converted and the light not converted. Specifically, the wavelength conversion device 49 transmits a part of the blue light input from the blue unit 40B, converts the rest of the blue light into the red light and the green light, and then emits the light including the red light, the green light, and the blue light to the collimating lens 472.

The wavelength conversion device 49 is provided with a rotating device 492, and a wheel 491 rotated by the rotating device 492 around a rotational axis parallel to the center axis of the light emitted from the blue unit 40B.

The rotating device 492 is formed of an electric motor. The drive of the electric motor is controlled by the control device 7. By being rotated by the rotating device 492, the wheel 491 is cooled.

At least either one of the surface on the light entrance side and the surface of the light exit side of the wheel 491 is provided with a fluorescent layer 493. The fluorescent body included in the fluorescent layer 493 emits the light including the green light and the red light in all directions when the fluorescent body partially absorbs the blue light input thereto, and is thereby excited. The lights (the red light and the green light) obtained by the wavelength conversion performed by such a fluorescent body as described above and the blue light not absorbed are transmitted through the wheel 491, and then enter the collimating lens 472.

Also in such a light source device 4C as described above, the control device 7 controls the temperature of the first light source group B1 and the temperature of the second light source group B2 of the blue unit 40B.

Thus, when displaying a two-dimensional image, the blue lights having respective wavelengths roughly equal to each other are emitted from the first light source group B1 and the second light source group B2 similarly to the projector 1 described above, and thus, the red light, the green light, and the blue light each having roughly the same wavelength are emitted from the light source device 4C.

Further, when displaying a three-dimensional image, since the blue lights having the respective wavelength bands separate from each other are emitted from the first light source group B1 and the second light source group B2, the wavelength of the light for forming one of the left-eye image and the right-eye image and the wavelength of the light for forming the other of the images can be separated from each other, and thus, it is possible to make it easy to separate the left-eye image and the right-eye image from each other.

According to the image display system related to the present embodiment explained hereinabove, in addition to the advantages substantially the same as those of the image display system 10 described above, the following advantage can be obtained.

That is, since the light source device 4A described above is provided with the single blue unit 40B as the temperature control object, the temperature control process can be simplified compared to the configuration provided with the red unit 40R, the green unit 40G, and the blue unit 40B for emitting the respective colored lights of red, green, and blue.

Modified Example of Second Embodiment

An optical device of the projector according to the second embodiment described above has the configuration of separating the red light, the green light, and the blue light emitted by the light source device 4A provided with the single blue unit 40B from each other, and then modulating the colored lights by the respective light modulation devices 34. In contrast, it is also possible to adopt an optical device 3A described below.

Figure 14:
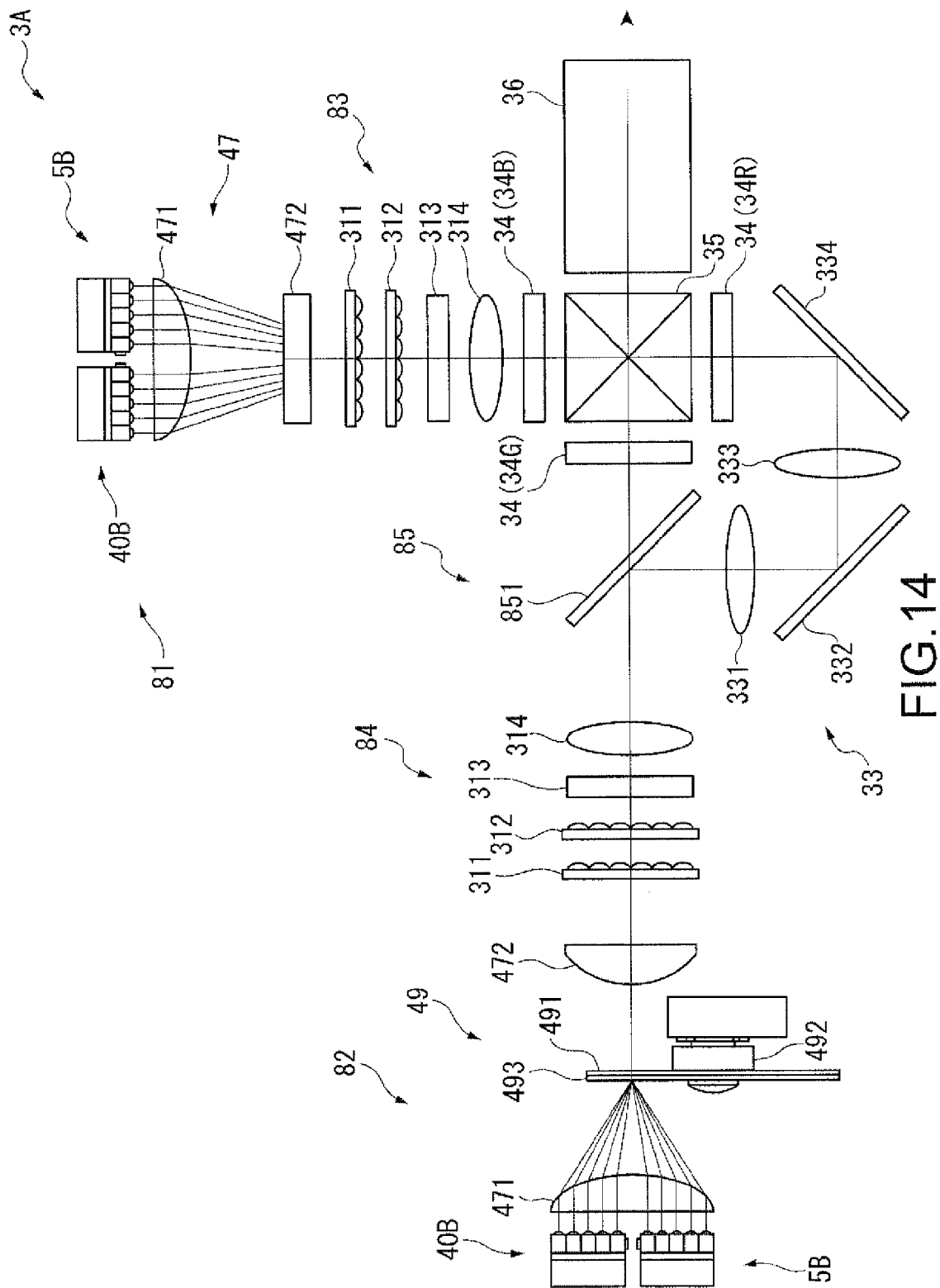
FIG. 14 is a schematic diagram showing a configuration of a modified example of an optical device in the second embodiment.

FIG. 14 is a schematic diagram showing the optical device 3A.

The optical device 3A forms and then projects the image corresponding to a drive signal input from the control device 7 similarly to the optical device 3 described above. As shown in FIG. 14, the optical device 3A is provided with a first light source device 81, a second light source device 82, a first uniform illumination device 83, a second uniform illumination device 84, a color separation device 85, the relay device 33, the light modulation devices 34, the color combining device 35, and the projection optical device 36.

The first light source device 81 emits the blue light entering the light modulation device 34B for the blue light. The first light source device 81 is provided with the blue unit 40B described above, the collecting lens 471, and the collimating lens 472. Further, the first light source device 81 emits the blue light to the first uniform illumination device 83. It should be noted that the blue temperature regulation section 5B described above is disposed so as to correspond to the blue unit 40B.

The first uniform illumination device 83 is provided with the first lens array 311, the second lens array 312, the polarization conversion element 313, and the overlapping lens 314, uniformizes the luminance in the plane orthogonal to the light axis of the blue light input from the first light source device 81, and then inputs the blue light to the light modulation device 34B similarly to the uniform illumination device 31 described above.

The second light source device 82 emits the red light and the green light to the second uniform illumination device 84. The second light source device 82 is provided with the blue unit 40B, the collecting lens 471, the wavelength conversion device 49, and the collimating lens 472 similarly to the light source device 4A described above. The fluorescent layer 493 of the second embodiment described above includes the fluorescent body for emitting the light including the green light and the red light when the fluorescent body partially absorbs the blue light input thereto, and is thereby excited. In contrast, at least either one of the surface on the light entrance side and the surface on the light exit side of the wheel 491 of the present modified example is provided with the fluorescent layer 493 including the fluorescent body for emitting the light including the green light and the red light when the fluorescent body absorbs roughly whole of the incident light, and is thereby excited.

In the second light source device 82, the whole of the blue light, which is emitted from the blue unit 40B and then input to the wheel 491 of the wavelength conversion device 49 via the collecting lens 471, is converted into the red light and the green light. Then, the red light and the green light obtained by the conversion are collimated by the collimating lens 472, and then enter the second uniform illumination device 84.

It should be noted that the blue temperature regulation section 5B described above is also provided separately for the blue unit 40B.

The second uniform illumination device 84 is provided with the first lens array 311, the second lens array 312, the polarization conversion element 313, and the overlapping lens 314, and uniformizes the illuminance in the plane orthogonal to the light axis of the light modulation devices 34 for the red light and the green light input from the second light source device 82 similarly to the first uniform illumination device 83. The red light and the green light emitted from the second uniform illumination device 84 enter the color separation device 85.

The color separation device 85 is provided with a dichroic mirror 851 for transmitting the green light and reflecting the red light out of the red light and the green light input from the second uniform illumination device 84, and the green light enters the light modulation device 34G for the green light.

On the other hand, the red light reflected by the dichroic mirror 851 enters the light modulation device 34R for the red light via the relay device 33.

Further, the colored lights are modulated by the corresponding light modulation devices 34, and then combined by the color combining device 35, and then projected on the projection surface described above by the projection optical device 36.

Even in the case in which such an optical device 3A as described above is adopted, the temperature of each of the blue units 40B of the first light source device 81 and the second light source device 82 is regulated by the cooling operation performed by the temperature regulation device 5 under the control by the control device 7. Thus, when displaying a two-dimensional image, the blue lights having respective wavelengths roughly equal to each other are emitted from the first light source group B1 and the second light source group B2, and thus, the red light, the green light, and the blue light having wavelengths roughly equal to each other are modulated by the respective light modulation devices 34R, 34G, and 34B. Therefore, the two-dimensional image with high luminance can be formed and then displayed.

Further, when displaying a three-dimensional image, since the blue lights having the respective wavelength bands separate from each other are emitted from the first light source group B1 and the second light source group B2, the wavelength of the light for forming one of the left-eye image and the right-eye image and the wavelength of the light for forming the other of the images can be separated from each other, and thus, it is possible to make it easy to separate the left-eye image and the right-eye image from each other.

Further, since the optical device 3A has the configuration provided with the totally two blue units 40B, the temperature control can be simplified compared to the configuration provided with the three light source units 40 corresponding respectively to the red light, the green light, and the blue light.

Modifications of Embodiments

The invention is not limited to the embodiments and the modified examples described above, but the embodiments and the modified examples can also be combined arbitrarily. Further, a variety of modifications can be allowed to be made in the invention besides the modified examples described above, and the invention includes such modifications, improvements, and so on within a range where either of the advantages of the invention can be achieved.

Although in each of the embodiments and the modified examples, the LD is adopted as the solid-state light source, the invention is not limited to the type of the solid-state light source, but a configuration having other solid-state light sources such as a light emitting diode (LED) or an organic light emitting diode (OLED) can also be adopted.

Although in each of the embodiments and the modified examples, it is assumed that the temperature regulation device 5 as the temperature regulation device controls the degree of cooling with respect to the first light source group and the second light source group to thereby regulate the temperature of each of the light source groups, the invention is not limited thereto. Specifically, it is also possible to dispose a heating device for individually heating the first light source group and the second light source group instead of, or in addition to the temperature regulation device.

It should be noted that in the case of raising the temperature, it is possible to reverse the current to be applied to the Peltier element of each of the regulation sections of the temperature regulation device 5 to thereby heat the light source group, or to decrease the amount of heat absorption of the regulation section to a level lower than the amount of the heat released from the light source group.

Although in each of the embodiments and the modified examples, there is disclosed the method of controlling both of the output wavelength bands of the first and second light source groups so as to be shifted to the respective sides opposite to each other, the invention is not limited to this method. For example, it is also possible to fix the peak wavelength of one of the first and second light source groups and shift only the peak wavelength of the other of the light source groups to thereby make the peak wavelengths of the first and second light source groups approach to or get further from each other. Further, for example, it is also possible to shift the peak wavelength of one of the first and second light source groups in an arbitrary direction, and shift the peak wavelength of the other of the light source groups in the same direction so as to provide a difference between the shift amounts to thereby make the peak wavelengths of the first and second light source groups approach to or get further from each other.

In other words, it is sufficient that the temperature control process can be performed so that the difference in the peak wavelength between the first and second light source groups in the case in which the projector forms a two-dimensional image is smaller than the difference in the peak wavelength between the first and second light source groups in the case in which the projector forms a three-dimensional image. It should be noted that although it is preferable that the wavelength bands of the lights emitted respectively from the first and second light source groups in the case in which the projector forms a three-dimensional image are completely separated from each other, it is also possible that the wavelength bands partially overlap each other providing at least the lights with the peak wavelengths of the first and second light source groups can be separated from each other by the bandpass filter provided to the left-eye selection section 91L of the pair of glasses and the bandpass filter provided to the right-eye selection section 91R.

Although in each of the embodiments and the modified examples described above, the blue temperature regulation section 5B of the temperature regulation device 5 has the configuration including heat receiving plates, the heatsinks, and the Peltier elements, the invention is not limited to the configuration of the blue temperature regulation section 5B. Specifically, any temperature regulation device having a cooling power necessary to regulate the temperature of the first light source group B1 and the temperature of the second light source group B2 to the desired levels can be adopted. Further, besides the configuration of delivering the cooling air, a configuration of circulating a cooling fluid such as ethylene glycol or water to thereby cool each of the light source groups can also be adopted. The same applies to other colors.

Further, each of the detection sections of the temperature detection device 6 is not limited in position and configuration providing the detection section is capable of detecting the appropriate temperature for regulating the temperature of the first light source group and the temperature of the second light source group to the desired levels.

Further, although in each of the embodiments and modified examples, it is assumed that the temperature detection device 6 is provided with the first detection section 6B1 provided to the first light source group B1 and the second detection section 6B2 provided to the second light source group B2, the invention is not limited to this configuration. Since the first light source group B1 and the second light source group B2 are normally disposed at positions close to each other, a configuration of providing the detection section to either one of the light source groups can also be adopted. The same applies to the detection sections disposed corresponding to other colors.

In this case, it is possible to previously examine the relationship between the temperature variations when driving the first light source group and the second light source group so that the temperature of one of the first light source group and the second light source group can be controlled by detecting the temperature of the other of the light source groups, and then control the temperature of the one of the light source groups based on the relationship.

It should be noted that in the case of providing the detection section to either one of the first light source group and the second light source group, it is preferable to dispose the detection section to the light source group located downstream in the flow path of the cooling air delivered by the fan of the temperature regulation device 5 out of the first light source group and the second light source group. This is because, the cooling efficiency on the downstream side in the flow path is lower than that on the upstream side, and therefore, the temperature of the light source group apt to rise in temperature can be obtained.

Further, a configuration without the temperature detection device can also be adopted. In this case, it is sufficient to previously examine the information for controlling the temperature regulation device 5 to set the temperature of the first light source group and the temperature of the second light source group to predetermined levels by performing, for example, an experiment or a simulation.

Although in each of the embodiments and the modified examples, the solid-state light sources having the output wavelength on the shorter wavelength side are selected in advance from the plurality of solid-state light sources, and then the first light source group is formed using these solid-state light sources, and further, the solid-state light sources having the output wavelength on the longer wavelength side are selected, and then the second light source group is formed using these solid-state light sources, the invention is not limited to this method. In the invention, the first light source group and the second light source group can be formed by any method providing the relationship of the output wavelengths described above is achieved. For example, it is possible to form two light source groups by arbitrarily selecting the solid-state light sources from the plurality of solid-state light sources, and use one of the light source groups thus formed having the output wavelength on the shorter wavelength side as the first light source group, and use one having the output wavelength on the longer wavelength side as the second light source group.

Although in each of the embodiments and the modified examples, it is assumed that the heatsink 5B11 of the first regulation section 5B1 is disposed upstream in the flow path of the cooling air, and the heatsink 5B21 of the second regulation section 5B2 is disposed downstream in the flow path of the cooling air, the invention is not limited to this configuration.

It is also possible that, for example, the heatsink 5B11 of the first regulation section 5B1 is disposed downstream in the flow path of the cooling air, and the heatsink 5B21 of the second regulation section 5B2 is disposed upstream in the flow path of the cooling air. The same applies to other colors. By disposing the heatsink connected to the first light source group upstream as described above, the cooling efficiency of the first light source group can be raised compared to that of the second light source group. Therefore, when making the peak wavelengths of the first light source group and the second light source group get further from each other, the first light source group having the peak wavelength on the shorter wavelength side can efficiently be cooled.

Although in each of the embodiments and the modified examples, it is assumed that the temperature regulation device 5 has a configuration of forming the airflow of the cooling air in a predetermined direction with respect to the light source unit 40, the invention is not limited to this configuration. Specifically, it is also possible to arrange that the direction of the airflow is controlled if necessary.

For example, it is also possible to control the flow direction of the cooling medium so that the second light source group is located upstream in the airflow while the first light source group is located downstream when forming a two-dimensional image, and to control the flow direction of the cooling medium so that the first light source group is located upstream in the airflow while the second light source group is located downstream when forming a three-dimensional image. Thus, it is possible to efficiently cool the light source group necessary to be dropped in temperature to thereby reduce the power consumption.

Although in each of the embodiments and the modified examples, it is assumed that one of the left-eye image and the right-eye image as the second image and the third image is formed by the light emitted from the first light source group, and the other of the images is formed by the light emitted from the second light source group, the invention is not limited to this configuration. For example, images having no relationship with each other can be formed by the light emitted from the first light source group and the light emitted from the second light source group, respectively. In this case, by using a pair of glasses having the bandpass filters, which are provided to the left-eye selection section 91L described above, disposed corresponding to the both eyes of the observer, and a pair of glasses having the bandpass filters, which are provided to the right-eye selection section 91R, disposed corresponding to the both eyes of the observer, the images different from each other can separately be observed.

Although in each of the embodiments and the modified examples, the projector provided with the three light modulation devices 34 (34R, 34G, and 34B) is described as an example, the invention is not limited to this configuration. Specifically, the invention can also be applied to a projector using two or less light modulation devices, or four or more light modulation devices.

Although in each of the embodiments and modified examples, the light modulation devices 34 each having the transmissive liquid crystal panel with the plane of incidence of light and the light exit surface different from each other are used, it is also possible to adopt a light modulation device having a reflective liquid crystal panel with the plane of incidence of light and the light exit surface being the same.

Although in each of the embodiments and the modified examples, the light modulation devices 34 (34R, 34G, and 34B) each have the configuration including the liquid crystal panel, it is also possible to adopt a light modulation device having other configurations providing the light modulation device forms the optical image by modulating the incident light in accordance with the image information. A light modulation device using a device other than the liquid crystal panel such as a device using micromirrors can also be adopted.

In each of the embodiments and the modified examples, the light source devices 4, 4A emit the light having the output wavelengths in the respective wavelength bands of the colors of red, green, and blue. However, the invention is not limited to this configuration, but can adopt a configuration provided with a first light source group for emitting light having an output wavelength in at least either one of the wavelength bands of red, green, and blue, and a second light source group for emitting light having an output wavelength corresponding to the output wavelength of the light emitted from the first light source group, and shifted toward the longer wavelength side from the output wavelength within the same wavelength band as that of the output wavelength.

Although in each of the embodiments and the modified examples, it is assumed that the light source unit has the first light source group having the plurality of solid-state light sources arranged, and the second light source group having a plurality of solid-state light sources arranged, the invention is not limited to this configuration. Specifically, the number of solid-state light sources provided to each of the light source groups is not particularly limited if the number is equal to or larger than one. Further, the number of light source groups provided to each of the light source units can also be three or larger.

Further, the number of light source units adopted by one projector can also be changed arbitrarily, and the configuration of the optical device can also be modified arbitrarily in accordance therewith.

Although in each of the embodiments and the modified examples, the projector is explained as an example of the image display device, the invention is not limited to the projector. For example, the invention can be applied to an image display device such as a liquid crystal display. In this case, it is sufficient that the configuration of the light source device described above is adopted as a backlight, and the temperature of the first solid-state light sources and the temperature of the second solid-state light sources provided to the light source device are controlled.

The invention can preferably be applied to a projector.

The entire disclosure of Japanese Patent Application No. 2012-175361, filed Aug. 7, 2012 is expressly incorporated by reference herein.

What is claimed is:

1. An image display device adapted to display an image corresponding to image information input, comprising:
    a light source device;
    a light modulation device adapted to modulate light emitted from the light source device to form the image;
    a temperature regulation device adapted to regulate temperature of the light source device; and
    a control device adapted to control the temperature regulation device, wherein
    the light source device includes
        a first solid-state light source adapted to emit light having a peak wavelength in at least one of wavelength bands of red, green, and blue, and
        a second solid-state light source adapted to emit light having a peak wavelength in the wavelength band and on a longer wavelength side of the peak wavelength of the light emitted from the first solid-state light source,
    the temperature regulation device includes
        a first regulation section adapted to regulate temperature of the first solid-state light source, and
        a second regulation section adapted to regulate temperature of the second solid-state light source,
    the control device separately controls the first regulation section and the second regulation section to make the first regulation section regulate the temperature of the first solid-state light source, and make the second regulation section regulate the temperature of the second solid-state light source,
    the control device includes
        an image determination section adapted to determine whether the image information is information including a first image or information including a second image and a third image different from each other, and
        a regulation control section adapted to control the temperature regulation device based on a determination result by the image determination section, and
    the regulation control section
        controls the first regulation section and the second regulation section to regulate the temperature of the first solid-state light source and the temperature of the second solid-state light source so that the peak wavelength of the first solid-state light source and the peak wavelength of the second solid-state light source approximate each other in a case in which the image determination section determines that the image information is the information including the first image, and
        controls the first regulation section and the second regulation section to regulate the temperature of the first solid-state light source and the temperature of the second solid-state light source so that the peak wavelength of the first solid-state light source and the peak wavelength of the second solid-state light source get further from each other in a case in which the image determination section determines that the image information is the information including the second image and the third image.

2. The image display device according to claim 1, further comprising:
    a temperature detection device adapted to detect the temperature of at least one of the first solid-state light source and the second solid-state light source, wherein
    the control device makes the first regulation section and the second regulation section respectively regulate the temperature of the first solid-state light source and the temperature of the second solid-state light source based on a detection result by the temperature detection device.

3. The image display device according to claim 1, wherein
    the first regulation section includes a heat radiator body connected to the first solid-state light source, and the second regulation section includes a heat radiator body connected to the second solid-state light source,
    the temperature regulation device includes a medium delivery section adapted to deliver a cooling medium to the heat radiator body connected to the second solid-state light source and the heat radiator body connected to the first solid-state light source, and
    the heat radiator body connected to the second solid-state light source is disposed upstream of the heat radiator body connected to the first solid-state light source in a flow path of the cooling medium delivered by the medium delivery section.

* * * * *